(12) United States Patent
Kummer

(10) Patent No.: US 10,534,335 B2
(45) Date of Patent: Jan. 14, 2020

(54) FACILITY MANAGEMENT SYSTEM

(71) Applicant: Sebastian Kummer, Munich (DE)

(72) Inventor: Sebastian Kummer, Munich (DE)

(73) Assignee: Sebastian Kummer, Munich (DE)

( * ) Notice: Subject to any disclaimer, the term of this patent is extended or adjusted under 35 U.S.C. 154(b) by 265 days.

(21) Appl. No.: 15/619,383

(22) Filed: Jun. 9, 2017

(65) Prior Publication Data
US 2017/0357227 A1    Dec. 14, 2017

(30) Foreign Application Priority Data

Jun. 10, 2016  (EP) .................................... 16173984

(51) Int. Cl.
*G05B 15/02*    (2006.01)
*G06F 3/01*    (2006.01)
*G06T 19/20*    (2011.01)

(52) U.S. Cl.
CPC ............. *G05B 15/02* (2013.01); *G06F 3/017* (2013.01); *G06T 19/20* (2013.01); *G06T 2200/04* (2013.01); *G06T 2200/24* (2013.01)

(58) Field of Classification Search
None
See application file for complete search history.

(56) References Cited

U.S. PATENT DOCUMENTS

2008/0307357 A1    12/2008   Gould et al.
2012/0029661 A1    2/2012    Jones et al.

FOREIGN PATENT DOCUMENTS

EP         2977840 A1    1/2016

OTHER PUBLICATIONS

Extended European Search Report dated Dec. 9, 2016, from counterpart European Application No. 16173984.2, 9 pp.

*Primary Examiner* — Syed A Roni
(74) *Attorney, Agent, or Firm* — Shumaker & Sieffert, P.A.

(57) ABSTRACT

A facility management system and method for planning and/or controlling a facility, in particular a fabrication facility, including a plurality of components. The facility management system includes at least one apparatus adapted to load component data object cubes (CDOCs) from a data cube library (DCL) stored in a database of the facility management system and to link the component data object cubes (CDOCs) to component data objects (CDOs) representing components of the facility. The loaded component data object cubes (CDOCs) linked to the component data objects (CDOs) include parameters of the respective components and are editable in a data edit model of the facility management system.

18 Claims, 11 Drawing Sheets

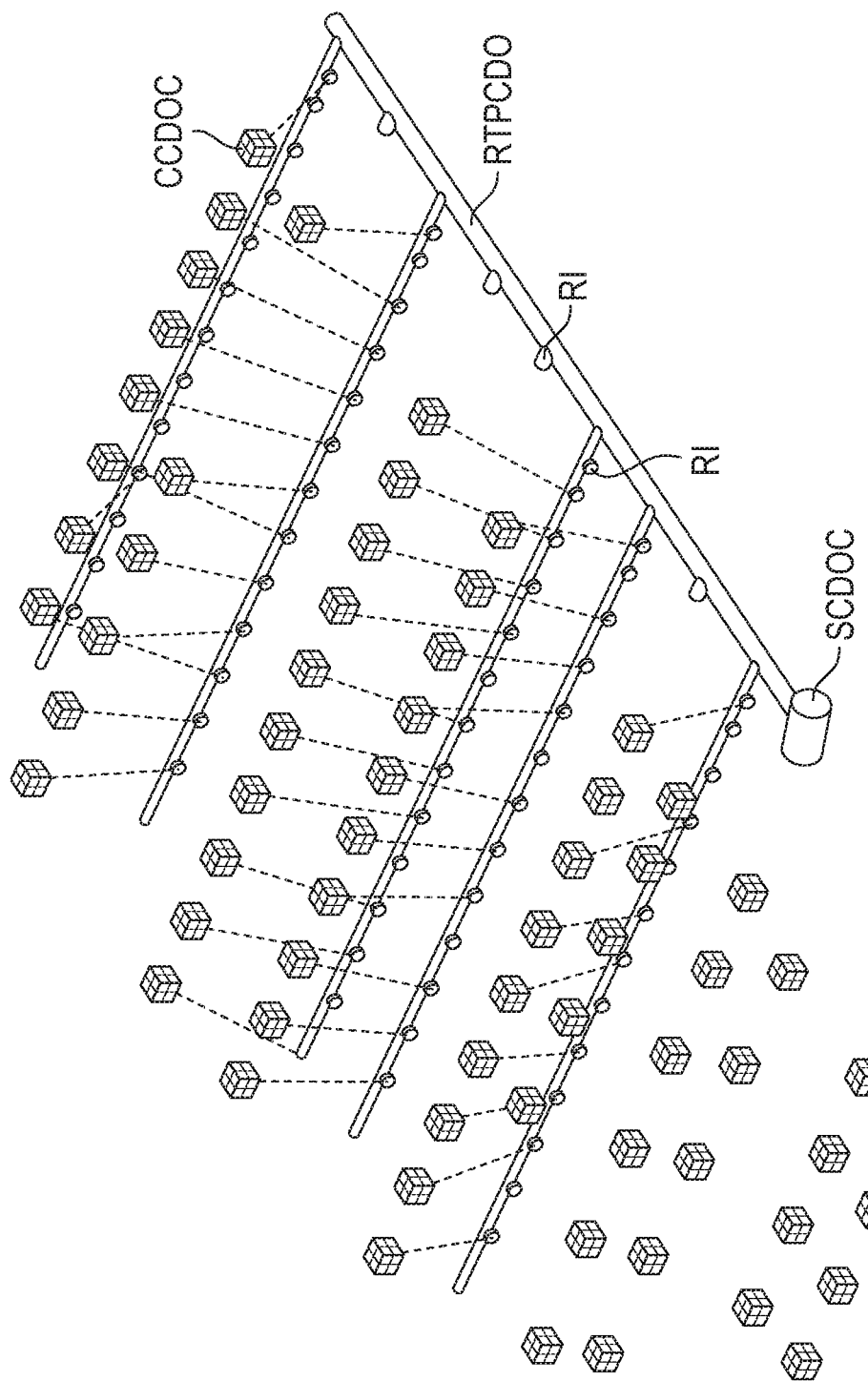

FACILITY MANAGEMENT SYSTEM

This application claims the benefit of European Patent Application 16173984.2, filed Jun. 10, 2016, the entire contents of which are hereby incorporated by reference.

TECHNICAL FIELD

The present invention relates to a facility management system for planning and/or controlling a facility in particular a fabrication facility such as a semiconductor fabrication facility.

TECHNICAL BACKGROUND

A facility in particular a production facility such as a semiconductor fabrication facility is a highly complex facility comprising a plurality of components in particular manufacturing machines which can perform process steps of a manufacturing process to manufacture a product such as integrated circuit. A semiconductor fabrication plant is a factory where integrated circuits can be manufactured. A central part of a semiconductor fabrication plant is for instance a clean room containing manufacturing machines for performing e.g. photolithography, cleaning or doping processes as well as dicing machines. A semiconductor fabrication plant does comprise a plurality of equipment items or manufacturing machines. Manufacturing machines are physical components which can consume resources to perform a manufacturing process step for processing the integrated semiconductor circuits. These resources comprise basic gas resources such as hydrogen gas or other gases necessary for the production process. Other resources required by the fabrication components are electrical energy supplied to the fabrication machine. Further, other resources are required such as water or other fluids. Electrical power for the fabrication components comprising machines is distributed within the production facility by a network of electrical wires and can be stored locally in batteries which also form physical components of the factory. Fluid and/or gas resources are provided to the manufacturing components through pipes which transport the required fluids to the fabrication machines in the clean room of a semiconductor production facility. The necessary resources consumed by the consuming manufacturing components are supplied through the electrical lines and/or pipes by these distribution components and can be generated by resource generators. Components of such a facility can be basic components or complex components consisting of sub-components. These components can comprise interface components adapted to connect at least two different components with each other. An interface component can be formed by a resource interface adapted to supply at least one resource from a first component to a second component within the facility. A highly complex facility in particular a semiconductor fabrication facility has a plurality of complex components which interact with each other during the operation of the components such as fabrication machines which depend on the efficient and reliable supply of resources to the respective component. The planning, controlling and management of a complex facility is a challenging task because the interplay between a plurality of components of different technical domains as well as the influence of the environment has to be considered.

Accordingly there is need to provide a system allowing to plan and operate a complex facility efficiently.

SUMMARY OF THE INVENTION

The invention provides according to the first aspect a facility management system for planning and/or controlling a facility, in particular a fabrication facility, comprising a plurality of components, said facility management system comprising at least one apparatus adapted to load component data object cubes from a data cube library stored in a database of said facility management system and to link the component data object cubes to the component data objects representing components of said facility, wherein the loaded component data object cubes comprise virtual entities visualizing data or parameters of the respective component and provide an interface in order to select, move or edit component data sets, stored in a centralized location or distributed locations in a data storage of said facility management system wherein the apparatus comprises a processing unit adapted to load at least one editable component data object cube from the data cube library stored in the database connected to the processing unit and adapted to link the loaded component data object cube to a component data object representing at least one component of said facility, wherein the apparatus further comprises a command input unit adapted to input commands into said processing unit or a gesture detection unit adapted to derive input commands from gesture made by the user and detected by the gesture detection unit.

The invention provides according to a further aspect of the present invention a facility management system for planning and/or controlling a facility, in particular a fabrication facility, comprising a plurality of components, said facility management system comprising at least one apparatus adapted to load component data object cubes, CDOCs, from a data cube library, DCL, stored in a database, DB, of said facility management system and to link the component data object cubes, CDOCs, with component data objects, CDOs, representing components, C, of the facility, wherein the loaded component data object cubes linked to the component data objects comprise parameters, P, of the respective components, C, and are editable in a data edit mode, DEM, of said facility management system.

In a further possible embodiment of the facility management system according to the first aspect of the present invention an operation of components of the facility is controlled or simulated by the facility management system by processing a generated facility data model of the facility comprising component data objects representing the components of the facility and having associated component data object cubes linked to the component data objects of the components of the facility.

In a further possible embodiment of the facility management system according to the first aspect of the present invention components of the facility are adapted to perform operations controlled and/or simulated by said facility management system, wherein the components of the facility comprise
resource providing components,
resource consuming components,
sensor components adapted to sense the provision and/or consumption of resources by other components of the facility and adapted to generate corresponding sensor parameters, and actuator components adapted to control the provision and/or consumption of resources by other components of said facility.

In a further possible embodiment of the facility management system according to the first aspect of the present invention the facility comprises a production facility, in particular a semiconductor fabrication facility.

In a further possible embodiment of the facility management system according to the first aspect of the present invention the facility comprises a building having building components.

In a still further possible embodiment of the facility management system according to the first aspect of the present invention the facility comprises a vehicle comprising vehicle components.

In a still further possible embodiment of the facility management system according to the first aspect of the present invention the component data objects representing components of the facility comprise embedded facility component data object cubes, including consumer component data object cubes and source component data object cubes.

In a further possible embodiment of the facility management system according to the first aspect of the present invention the component data objects representing components of the facility comprise embedded cost component data object cubes, comprising cost parameters of the respective component.

In a still further possible embodiment of the facility management system according to the first aspect of the present invention the component data objects representing components of the facility comprise embedded scheduling component data object cubes, comprising scheduling parameters of the respective component.

In a still further possible embodiment of the facility management system according to the first aspect of the present invention the component data objects representing components of the facility comprise embedded organization component data object cubes, comprising organization parameters of the respective component.

In a further possible embodiment of the facility management system according to the first aspect of the present invention the components of said facility comprise interface components adapted to receive control signals provided by a controller of said facility.

In a further possible embodiment of the facility management system according to the first aspect of the present invention the control signals received by said at least one interface are generated by said controller of said facility on the basis of a facility data model of said facility stored in a memory and comprising component data objects representing components of the facility, and having associated component data object cubes linked to the component data objects representing the components of said facility and on the basis of sensor parameters provided by at least one sensor component of said facility.

In a further possible exemplary embodiment of the facility management system according to the first aspect of the present invention the control signals are generated by the controller of said facility in real time by processing the facility data model in response to sensor parameters received from at least one sensor component of said facility and supplied to actor components of said facility.

In a further possible exemplary embodiment of the facility management system according to the first aspect of the present invention the control signals comprise electrical control signals carried by an electrical resource, or hydraulic control signals carried by a fluid resource and/or pneumatic control signals carried by a gas resource of said facility.

In a further possible exemplary embodiment of the facility management system according to the first aspect of the present invention the at least one sensor component of the facility is adapted to sense the provision and/or consumption of resources by other components of the facility.

In a further possible exemplary embodiment of the facility management system according to the first aspect of the present invention the controller is adapted to process the facility data model of the facility in response to commands input by a user by means of the command input unit, in particular a computer mouse.

In a further possible exemplary embodiment of the facility management system according to the first aspect of the present invention the controller is adapted to process the facility data model of the facility in response to gestures made by a user and detected by a gesture detection unit connected to the controller of said facility.

In a still further possible exemplary embodiment of the facility management system according to the first aspect of the present invention the facility data model of the facility is displayed to the user by means of a display unit of the facility management system.

In a still further possible exemplary embodiment of the facility management system according to the first aspect of the present invention the facility data model of the facility is displayed to the user by means of a virtual reality goggle or by means of an augmented reality goggle worn by the user.

The invention provides according to the second aspect of the present invention a method for planning and operating a facility comprising a plurality of components, each represented by a component data object, comprising the step of: loading (S1) component data object cubes from a data cube library stored in a facility management system; and linking (S2) the component data object cube to the component data objects representing components of said facility; wherein the loaded component data object cubes comprise virtual entities included in the loaded component data object cubes; and selecting, moving or editing (S3) component data sets, stored in a centralized location or distributed location in a data storage of said facility management system.

wherein said component data object comprises at least one associated component data object cube linked to said component data object comprising parameters of the respective component and being editable in a data edit mode.

In a possible embodiment of the method according to the second aspect of the present invention each component data object representing at least one component of the facility is transparent in a data edit mode and comprises embedded component data object cubes linked to said component data object.

In a further possible embodiment of the method according to the second aspect of the present invention the component data object cube linked to a component data object comprises a consumer component data object cube comprising consumption parameters of the respective component and/or a source component data object cube comprising source parameters of the respective component.

In a further possible embodiment of the method according to the second aspect of the present invention the consumption parameters of a consumer component data object cube linked to a component data object representing a component of said facility indicate resources consumed by the respective component.

In a further possible embodiment of the method according to the second aspect of the present invention the source parameters of a source component data object cube linked to a component data object representing a component of said facility indicate resources provided by the respective component to other components of said facility.

In a further possible embodiment of the method according to the second aspect of the present invention the resources consumed by a component of the facility or provided by the component to other components of the facility as indicated by the consumption parameters of the consumer component data object cubes linked to the component data object representing the component, and as indicated by the source parameters of source component data object cubes linked to the component data object representing said component comprise energy resources, including electrical power and/or physical resources including fluids or gases and/or information transportation and processing resources.

In a still further possible embodiment of the method according to the second aspect of the present invention the component of the facility comprises at least one subcomponent and/or at least one interface component forming a resource interface with another component of the facility connected to said component to receive a resource from the connected other component, or to provide a resource to the connected other component of the facility.

In a still further possible embodiment of the method according to the second aspect of the present invention the component data object representing a component of the facility comprises component data object cubes of different cube types for each resource type of a resource consumed by the respective component or provided by the respective component to another component of the facility.

In a further possible embodiment of the method according to the second aspect of the present invention the size of a component data object cube corresponds to an amount or a rate of a resource consumed by the respective component or provided by the respective component to another component of said facility.

In a further possible embodiment of the method according to the second aspect of the present invention data of component data object cubes of the same cube type within the component data object representing the same component are merged automatically in response to a merge command.

In a still further possible embodiment of the method according to the second aspect of the present invention one or several component data objects of components of the facility are selected in response to a selection command.

In a further possible embodiment of the method according to the second aspect of the present invention the consumed and/or provided resources of the same resource type as indicated by the consumption parameters of the consumer component data object cubes and/or by the source parameters of the source component data object cubes of the corresponding cube type of the selected component data objects are aggregated automatically in response to an aggregation command to calculate an aggregated resource consumption value and/or an aggregated resource provision value for all selected component data objects.

In a further possible exemplary embodiment of the method according to the second aspect of the present invention a component data object cube is loaded from a data cube library stored in a database or generated in response to a cube generation command, wherein basic parameters are loaded automatically from a project data cube having a relational link with said component data object cube.

In a further possible exemplary embodiment of the method according to the second aspect of the present invention a component data object cube loaded from said data cube library or generated in response to the cube generation command is linked to a component data object of a component of the facility by placing the component data object cube on the component data object using a cube positioning command and confirming the link between the component data object cube and the component data object with a link command.

In a further possible embodiment of the method according to the first aspect of the present invention a position of a component data object on a display unit representing a component of said facility corresponds to a location of the component represented by the component data object within the respective facility.

In a further possible embodiment of the method according to the first aspect of the present invention a component data object cube is linked to an instance of said component data object.

In a still further possible exemplary embodiment of the method according to the second aspect of the present invention a consumer component data object cube of a specific cube type linked to a component data object of a component of the facility is connected to a target source component data object cube of the same cube type linked to a component data object of another component of the facility by selecting that consumer component data object cube in response to a selection command to generate automatically a stretchable rubber band symbol between the selected consumer component data object cube and a cursor which is moved in response to a cursor position control command to the position of the target source component data object cube and/or to the position of automatically generated copies of said target source component data object cube.

In a possible exemplary embodiment of the method according to the second aspect of the present invention the target source component data object cube is positioned along a resource transport pipe component data object representing a pipe component, said transport pipe component data object connecting the target source component data object cube or copies of the target source component data object cube with consumer component data object cubes of consumer component objects representing consumer components connected to said pipe component.

In a further possible exemplary embodiment of the method according to the second aspect of the present invention the resource transport pipe component data object represents a resource transport pipe component adapted to transport a resource of a resource type corresponding to the cube type of the at least one consumer component data object cube and the cube type of the target source component data object cube.

BRIEF DESCRIPTION OF FIGURES

In the following possible exemplary embodiments of the different aspects of the present invention are described in detail with reference to the enclosed figures.

FIG. 10 illustrates a specific example for illustrating a possible exemplary embodiment of the method and system according to the present invention;

DETAILED DESCRIPTION OF EMBODIMENTS

Figure 1:
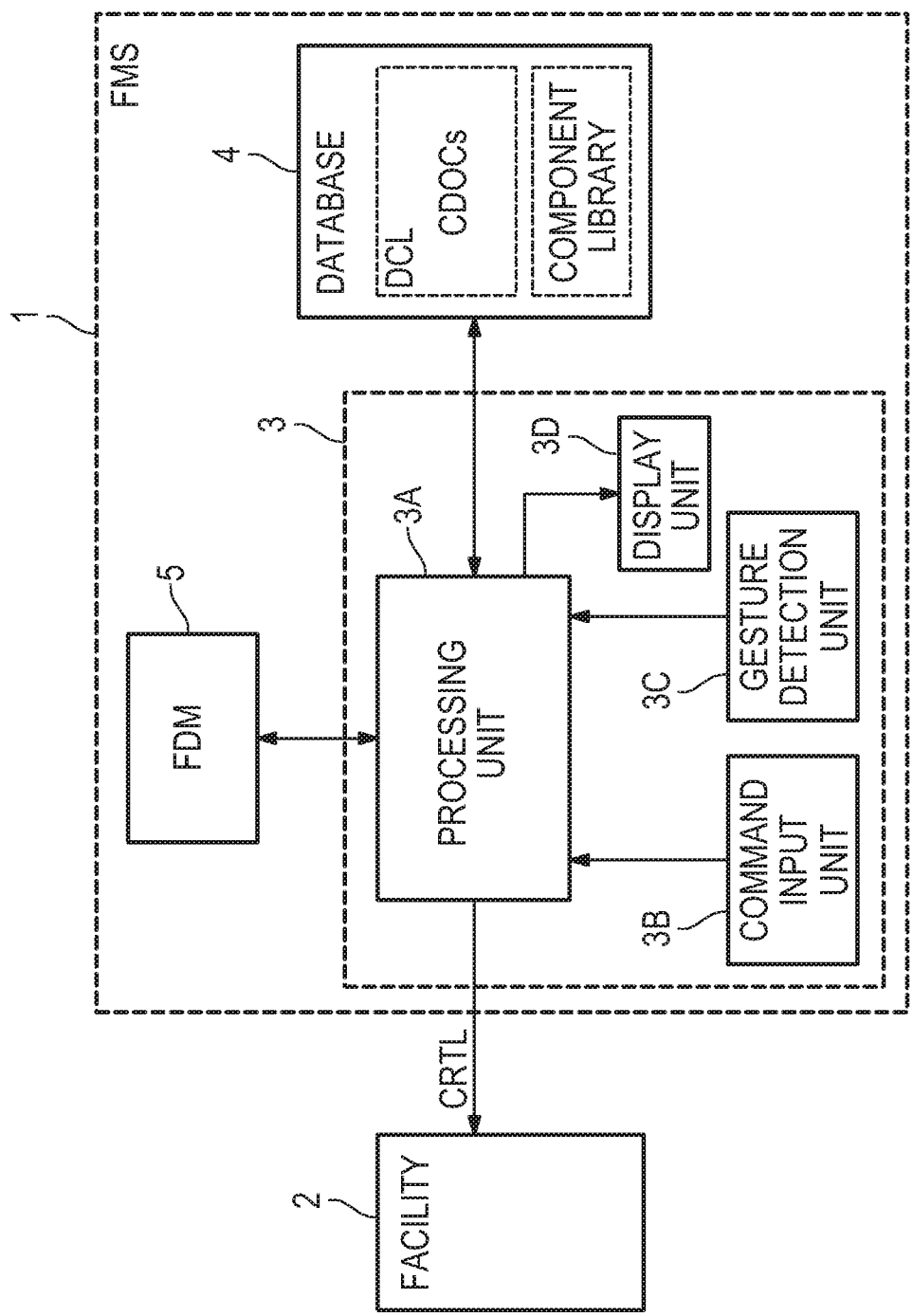
FIG. 1 shows a block diagram of a possible exemplary embodiment of a facility management system according to the first aspect of the present invention.

FIG. 1 shows a block diagram which illustrates a possible exemplary embodiment of a facility management system 1 according to the first aspect of the present invention. The facility management system 1 is adapted to plan and/or control a facility 2. The facility 2 is for example a fabrication facility adapted to produce products. The facility 2 can be for instance a semiconductor fabrication facility adapted to produce integrated circuits. The facility 2 comprises a plurality of components C such as fabrication machines or resource transport pipes. The facility 2 comprises complex components which can consist of other components or sub-systems. The facility 2 can comprise a plurality of components and each component can comprise at least one sub-component. The components can comprise interface components which are provided to connect different components within the factory 2 with each other. The interface components can comprise resource interfaces with other components of the same facility 2. Resource interfaces connected to at least one other component of the facility 2 are adapted to receive a resource R from the at least one other connected component or to provide a resource R to the connected other component of the same facility 2. A component C of the facility 2 can comprise a resource providing component adapted to provide resources and/or a resource consuming component adapted to consume resources R. The resources R comprise any kind of usable resources necessary for the operation of the facility 2. The resources R can comprise energy resources especially electrical current or power consumed by components C such as fabrication components during operation to perform a manufacturing process. Further, the resources R can comprise physical resources including fluids or gases. For instance the physical resources R can comprise gases necessary to manufacture an integrated circuit such as $H_2$.

Typical resources R can comprise raw materials provided to the fabrication machines or fabrication stages consumed by the components to produce intermedia products or a final product. Typical resources R can comprise solid materials, fluid materials and/or gases. The physical resources R can be consumed by the components during the fabrication processes or can be necessary to operate the components for instance by cooling the components using for instance cooling water as a resource. The resources R can comprise energy resources wherein the energy can be carried differently for instance by an electrical power signal or by pneumatic pressure. The resources R can further comprise information resources carried by information transporting signals. Information resources R can be resources for storing, transporting and/or processing data, in particular control data used for controlling the operation of the facility 2. Accordingly there are different resource types RT for different kinds of resources R including energy resources, physical resources and information resources.

The components C of the facility 2 comprise in a possible embodiment also sensor components SC adapted to sense the provision and/or consumption of resources R by other components of the facility 2 wherein the sensor components SC are adapted to generate corresponding sensor parameters. The components of the facility 2 can further comprise actuator components AC adapted to control the provision and/or consumption of resources R by other components C of the same facility 2. Sensor components SCs can be for instance sensors adapted to sense the supply of electrical power and/or fluids or gases by one component C to another component C' of the facility 2. The actuator components ACs can comprise switches adapted to control the provision of electrical power to components of the facility 2 or can be for example valves or pumps controlling the supply of a gas or fluid to a component C of the facility 2.

Figure 12:
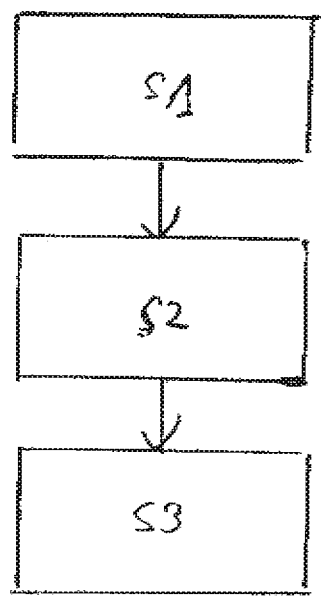
FIG. 12 shows a flowchart of an embodiment of a method for planning and/or operating a facility according to the second aspect of the present invention.

The facility management system 1 comprises at least one apparatus 3 adapted to load component data object cubes, CDOCs, from a data cube library, DCL, stored in a database 4 of the facility management system 1. The apparatus 3 comprises a processing unit 3A in a step S1 illustrated in the flowchart of FIG. 12 adapted to load component data object cubes, CDOCs, from the data cube library, DCL, stored in the database 4 of the facility management system 1 to link the component data object cubes to component data objects, CDOs, representing components C of the in a step S2 facility 2. The loaded component data object cubes linked to the component data objects comprise parameters P of the respective components C which are editable in a data edit mode DEM of the facility management system 1. The data edit mode DEM in step S3 allows to edit data in particular parameters P and can be implemented as a transparent data edit mode which supports the visualization of the respective data within the facility 2. As can be seen in FIG. 1, the apparatus 3 comprises in a possible embodiment a command input unit 3B. The command input unit 3B is adapted to input commands to the processing unit 3A. The command input unit 3B can be a user command input unit such as a keyboard or a computer mouse to input different commands to the apparatus 3. The command input unit 3B can also comprise a command interface to receive commands from a remote controller or server of a network. In the illustrated embodiment of FIG. 1 the apparatus 3 does also comprise a gesture detection unit 3 adapted to detect gestures made by a user to derive input commands for the processing unit 3A of the apparatus 3. The apparatus 3 can further comprise a display unit 3D adapted to display a facility data mode FDM to a user. In a possible embodiment the operation of some or all components C of the facility 2 is controlled or simulated by the facility management system 1 by processing a loaded or generated facility data model FDM of the facility 2 comprising component data objects CDOs representing the components C of the facility 2 and having associated component data object cubes CDOCs linked to the component data objects CDOs of the components C of the facility 2.

In a possible embodiment the facility data model FDM of the facility 2 is displayed to a user by means of the display unit 3D of the apparatus 3. In a further possible embodiment a facility data model FDM of the facility 2 is displayed to the user by means of a virtual reality, VR, goggle or by means of an augmented reality, AR, goggle worn by the respective user.

The facility data model FDM can be generated by the processing unit 3A of the apparatus 3 on the basis of the component data object cubes CDOCs and/or component data objects CDOs loaded from database 4 in response to commands input by user through the command input unit 3B and/or through the gesture detection unit 3C. The generated facility data model, FDM, can be stored in a memory 5 of the facility management system 1 as illustrated in FIG. 1. The facility data model, FDM, stored in the memory 5 of the facility management system 1 comprises component data objects, CDOs, representing the components C of the facility 2 and having associated component data object cubes CDOCs linked to the component data objects CDOs of the components C of the respective facility 2.

Component data objects CDOs representing the components C of the facility 2 comprise in a possible embodiment embedded facility component data object cubes, FCDOCs, including consumer component data object cubes, CCDOCs, and source component data object cubes, SCDOCs. A consumer component data object cube CCDOC within a component data object, CDO, can comprise consumption parameters CPs of the respective component C. A consumption parameter CP can indicate the amount or rate or even consumption profile of a resource R consumed by the respective component C. For instance a consumption parameter CP can indicate how much electrical power is consumed by the respective component C within a predetermined time period. Further, a consumption parameter CP may indicate the amount or rate of a physical resource R consumed by the respective component C during a specific time period. Each CDO comprises a unique identifier (ID). Further each CDOC comprises a unique identifier (ID). The identifiers allow to link CDOs with each other. Further CDOCs can be linked with each other or attached to CDOs or embedded within CDOs.

The embedded facility component data object cubes, FDOCs, further comprises source component data object cubes, SCDOCs. A source component data object cube, SCDOC, comprises source parameters SP of the respective component C indicating the amount or rate or even provision profile of a specific resource R which can be provided by the respective component C of the facility 2 to at least one other component of the same facility 2. A source parameter SP can for instance indicate the amount of electrical power which can be provided by the respective component C to another component of the facility 2. Further, the source parameter SP can for instance indicate the amount or rate of a physical source R such as a fluid or gas provided by the respective component C to at least one other component of the facility 2.

Component data objects CDOs and component data object cubes CDOCs can be stored in the database 4 of the facility management system 1. The database 4 can comprise a data cube library, DCL, comprising a plurality of component data object cubes CDOCs of different component data objects, CDOs. The component data objects, CDOs, can comprise the embedded facility component data object cubes, FCDOCs, including the consumer component data object cubes, CCDOCs, and the source component data object cubes, SCDOCs, but also other embedded component data object cubes. In a possible embodiment the component data objects cubes CDOCs stored in the database 4 can also comprise embedded cost component data object cubes, COST-CDOCs, embedded scheduling component data object cubes, SCH-CDOCs, and/or embedded organization component data object cubes, ORG-CDOCs.

The embedded cost component data object data object cubes COST-CDOCs can for instance comprise cost parameters of the respective component C within the facility 2. These cost parameters can indicate the costs for implementing and/or operating and/or maintaining the respective component C within the facility 2 during a process.

The scheduling component data object cubes, SCH-CDOCs, can comprise the scheduling parameters SCH-P of the respective component C within the facility 2 for instance a time when different components C are available during a project.

Further, the embedded organization component data object cubes, ORG-CDOCs, embedded within different component data objects, CDOs, can comprise organization parameters of the respective components C of the facility 2. For instance, the organization parameters ORG-P can indicate who is responsible for the planning and/or operation of the respective component C. Further, the organization parameters can also for instance indicate who is responsible for the repair and/or maintenance of a specific component C within the facility 2.

Each component data object, CDO, representing a physical component C such as a fabrication machine component can comprise component data object cubes, CDOCs, of different cube types CT including facility component data object cubes FCDOCs related to consumed or provided resources R, embedded cost component data object cubes COST-CDOCs related to costs involved with the planning, operation or maintenance of the respective component C, scheduling component data object cubes SCH-DOCs related to the scheduling of the planning, operation or maintenance of the respective component C, and organization component data object cubes ORG-DOCs related to the organization of the planning, operation and/or maintenance of the respective component C. In a possible implementation the processing unit 3A is adapted to filter component data object cubes CDOCs of different types in response to a cube type, CT, filtering command input by a user or controller. In a possible implementation a user can select between different views for instance to view only the embedded facility component data object cubes FCDOCs embedded in the component data objects CDOs representing the different components C of the facility 2. By inputting a filter command a user can switch to another view where for instance only the relevant embedded cost component data object cubes COST-CDOCs are displayed to the user. Further, the user may switch to a view showing only the embedded scheduling component data object cubes SCH-DOCs or showing only embedded organization component data object cubes ORG-DOCs of the component data objects, CDOs, representing the components C of the facility 2.

The facility 2 can be a production facility but also any other kind of facility. The facility 2 can comprise for instance a building comprising building components and/or a vehicle comprising vehicle components. A production plant such as a semiconductor production plant can consist in a possible embodiment of a production facility 2 comprising all components C necessary for the production of semiconductor products and also a building facility 2 comprising building components BC of the production plant such as rooms, doors or floors where the different production facility components C are mounted. Further, the production facility 2 may also include vehicles such automated transporters moving within the building of the production facility 2 and controlled by a control unit of the production facility 2. In this embodiment the components C of the facility 2 such as a semiconductor fabrication facility do not only include production components but also building components and/or vehicle components. Each component C is represented by a component data object, CDO. Each component data object CDO comprises at least one associated component data object cube, CDOC, linked to the component data object CDO. A component data object, CDO, can comprise several component data object cubes CDOCs of different cube types CTs, in particular different resource cube types. The component data object CDO can for instance comprise at least one associated resource component data object cube CDOC for each resource R consumed or provided by the respective component C and/or cost component data object cubes COST-CDOCs, embedded scheduling component data object cubes SCH-CDOCs and/or embedded organization component data object cubes ORG-CDOCs. Each associated component data object cube CDOC of a component data object CDO comprises at least one parameter P of the respective component C which can be edited by a user in a data edit mode DEM. The data edit mode DEM is a transparent graphical edit mode which allows the user to efficiently edit and visualize data relevant for the respective component C of the facility 2. A component data object, CDO, representing at least one component C of the facility 2 is transparent in the data edit mode, DEM, so that the embedded component data object cubes, CDOCs, linked to the component data object, CDO, become visible to the user when displaying the facility data model, FDM, to the user looking at the display unit 3D of the apparatus 3 or wearing a virtual reality, VR, or augmented reality, AR, goggle.

The size or volume of a displayed component data object cube, CDOC, corresponds in a possible embodiment to an amount or to a rate of a resource R consumed of the associated component C or provided by the respective component C to another component of the facility 2. Accordingly, component data object cubes CDOCs embedded in a component data object, CDO, representing a component C of the facility 2 consuming a large amount of a resource R such as water is bigger in size than the component data object cubes, CDOCs, of a component data object, CDO, representing other components C within the facility 2 consuming a smaller amount of the same resource R, e.g. water $H_2O$. Accordingly, a user can immediately recognize the relevance of a specific component C for the provision or consumption of the respective resource R.

By means of the user command input unit 3B and/or the gesture detection unit 3C different kinds of commands can be input by a user such as a technician or by a remote controlling device to load, generate and/or update the facility data model, FDM, of the facility 2. These commands COMM can comprise in a possible embodiment cube generation commands, cube positioning commands, cube link commands, cube merge commands, cube selection commands, cube aggregation commands, cube edit commands, link commands or cube copy commands or cube delete commands. A component data object cube, CDOC, can be loaded from the data cube library, DCL, of the database 4 or can be generated automatically in response to a cube generation command. In a possible embodiment basic parameters are automatically copied into the component data object cube CDOC from a project data cube, PDC, having a relational link with the component data object cube DOC. Component data object cubes, CDOC, loaded from the data cube library, DCL, or generated in response to a cube generation command can be linked in a possible embodiment to a component data object, CDO, representing a component C of the facility 2 by moving the loaded or generated component data object cube, CDOC, to the component data object, CDO, using a cube positioning command and confirming a link between the component data object cube, CDOC, and the component data object, CDO, by means of an input linking command. The user may use a computer mouse to move a loaded and/or generated component data object cube CDOC to a displayed component data object, CDO, representing a component C of the facility 2. As soon as the moved component data object cube, CDOC, is at the position of the displayed component data object, CDO, the user can perform e.g. a double click to link the moved component data object cube CDOC with the respective component data object CDO. Accordingly, component data object cubes of the facility data model, FDM, can undergo a drag-and-drop operation using a computer mouse. Component data objects, CDOs, of components C of the facility 2 can be selected in response to a selection command input by a user or by a remote control unit of the facility management system 1. In a possible implementation a component data object, CDO, can be for instance selected by moving a cursor by means of a computer mouse to the displayed computer data object, CDO, and by selecting the component data object CDO with a single mouse click.

In a further possible embodiment data of component data object cubes, CDOCs, of the same cube type CT embedded within a component data object, CDO, representing at least one component C of the facility 2 can be merged automatically to response to a specific merge command input by a user by means of the command input unit 3B and/or the gesture detection unit 3C, or input by a control unit of the facility management system 1. In a complex facility component C such as a facility production machine consisting of several sub-components the data of component data cubes CDOCs of the same cube type CT can be merged automatically in response to an input merge command. This has the advantage that the number of graphical elements, in particular component data object cubes CDOCs displayed to the user can be reduced without losing information. When merging different component data object cubes CDOCs the information including the geometric position data stored in the different component data object cubes can be merged into a single component data object cube stored automatically for further processing.

A component data object cube, CDOCs, generated or loaded from the database 4 can be positioned in the facility data model FDM displayed for instance on the display unit 3D by using a positioning command for instance by dragging the component data object cube CDOC to the fitting position by means of a computer mouse. When a component data object cube CDOC is generated basic parameters can be taken from a project data cube, PDC, of a facility planning operation or maintenance project. In a possible embodiment the consumed and/or provided resources R of the same resource type RT as indicated by the consumption parameters CPs of the consumer component data object cubes, CCDOCs, and by the source parameters SPs of the source component data object cubes, SCDOCs, of the corresponding cube type CT of the selected component data objects, CDOs, can be aggregated automatically in response to an input aggregation command to calculate automatically an aggregated resource consumption value and/or an aggregated resource provision value for all selected component data objects CDOs.

In a further possible embodiment a consumer component data object cube, CCDOC, of a specific cube type CT being linked to a component data object, CDO, of a component C of the facility 2 can be connected to a target source component data object cube, SCDOC, of the same cube type CT being linked to a component data object CDO of another component C of the same facility 2 by selecting the consumer component data object cube, CCDOC, in response to a selection command to generate automatically a stretchable rubber band symbol between the selected consumer component data object cube, CCDOC, and a cursor which can be moved in response to a cursor position control command to the position of the target source component data object cube, SCDOC, or to a position of an automatically generated copy of the target source component data object cube. A target source component data object cube, SCDOC, can be positioned in a possible embodiment along a resource transport pipe component data object connecting source component data object cube, SCDOC, copies with the target source component data object cube. The transport pipe component data object can represent a resource transport pipe component adapted to transport a resource R such as a gas or fluid of a specific resource type RT corresponding to the cube type CT of the consumer component data object cube CCDOC and of the target source component data object cube, SCDOC.

In a possible embodiment different commands can be input by a user command input unit 3B such as a keyboard or alternatively by a gesture detection unit 3C detecting gestures made by a user. The user can wear in a possible embodiment an augmented reality, AR, goggle or a virtual reality, VR, goggle. The goggle displays the facility data model, FDM, of the facility 2 to the user. The user can see the different component data objects CDOs of the plurality of components C and each component data object CDO can have one or several embedded component data object cubes CDOCs of the same or different types indicating for instance the amount of resources R consumed or provided by the associated component C represented by the component data object CDO. Different gestures of the use can be associated to different input commands for loading, generating or deleting component data objects, CDOs, and/or for loading, generating or deleting component data object cubes CDOCs embedded within the respective component data object, CDO. Further, the commands can comprise commands for moving or shifting component data objects CDOs and/or its embedded component data object cubes CDOCs. Further a gesture can be made by the user for moving component data object cubes CDOCs within the facility data model, FDM. The user can link a shifted or moved component data object cube CDOC to a displayed component data object CDO with an associated gesture translated automatically into a link command. The user can select and move component data object cubes CDOCs and/or associated component data objects CDOs by a selection gesture translated automatically into a selection command. Further, the user can input a merge command in response to a merge command gesture or an aggregation command in response to an aggregation command gesture. For instance, the user can define the scope of the aggregation by pointing his finger to all component data objects CDOs to participate in the merging or by drawing a borderline to define an area or space including all component data objects, CDOs, to be merged. The facility data model FDM comprises in a preferred embodiment for each component data object, CDO, the position data of the corresponding component C within the facility 2. Each component C of the facility 2 comprises position data or coordinates, X,Y,Z, defining the position of the component C within the facility 2. Further, each component C of the facility 2 can comprise data indicating the height H, width W and depth D of the respective component C, i.e. its three-dimensional size and/or volume in the facility 2. If the facility data model FDM is displayed as a virtual reality, VR, model to the user, the user can move virtually within the displayed facility 2 to look at specific areas or portions within the facility 2. In a possible implementation the user can for instance grab with a specific hand gesture a displayed component data object cube, CDOC, and move it with the virtual displayed hands to another component data object CDO, to copy the grabbed component data object cube CDOC to be embedded in the other component data object, CDO. A component data object cube CDOC can be linked for instance of the respective component data object, CDO. In a possible embodiment the position of the displayed component data object, CDO, representing a component C of the facility 2 corresponds to the physical location of the real component C represented by the component data object, CDO, within the facility 2. The display can be the display unit 3D of the apparatus 3, or a display of a AR and/or VR goggle worn by a user.

In the following possible embodiments of method and system according to the present invention are described in more detail with respect to the other FIGS. 2 to 12.

Figure 2:
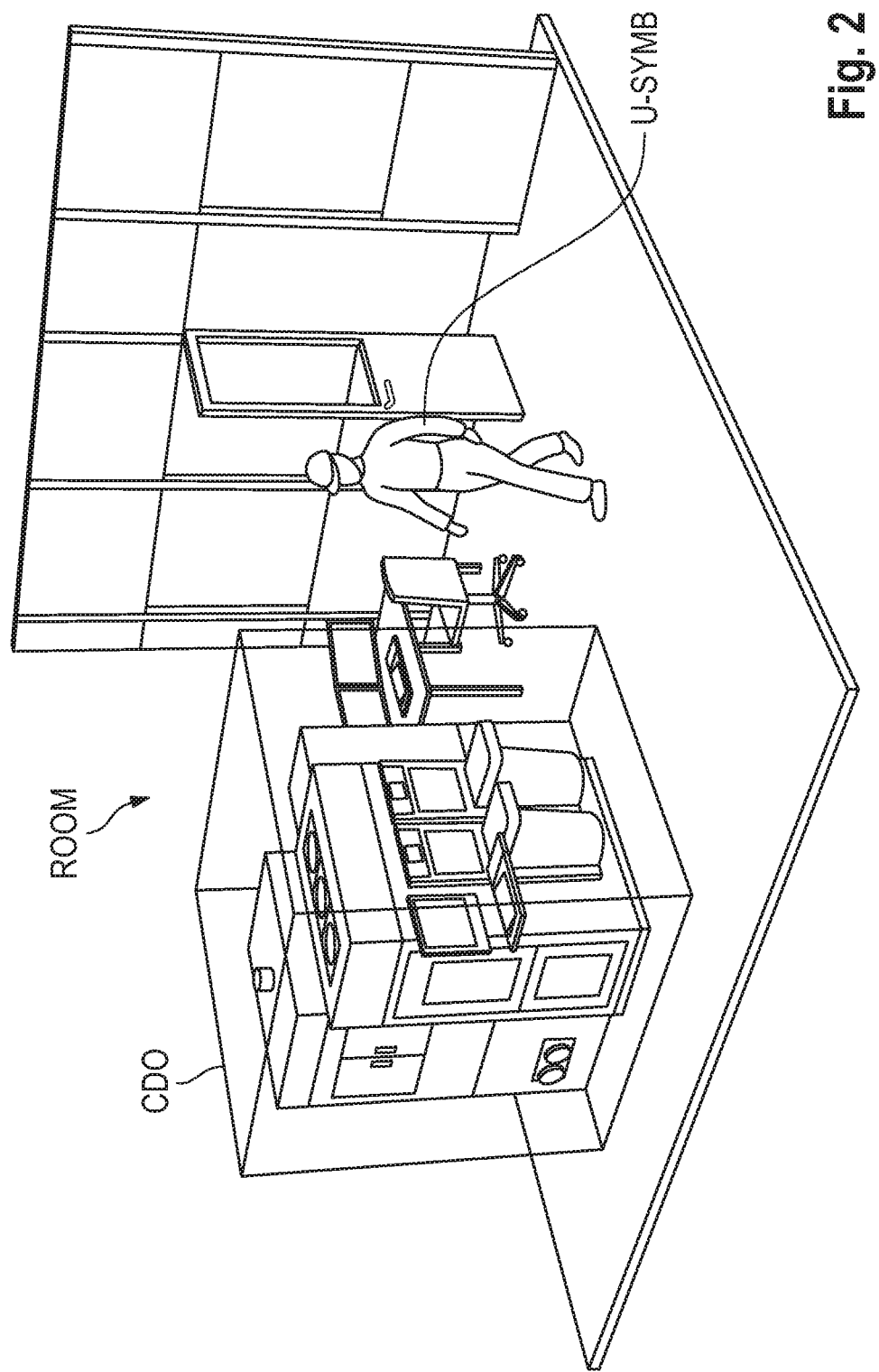
FIG. 2 shows a schematic view for illustrating a component data object, CDO, as used within a facility management system according to the first aspect of the present invention and as used by a method for planning and/or operating a facility according to the second aspect of the present invention.

FIG. 2 illustrates a component data object, CDO, representing a component C within the facility 2. In the illustrated example the component data object CDO is a complex production machine forming a complex component C consisting of a plurality of sub-components including interface components. The displayed component data object CDO is represented by a component symbol showing the shape and form of the associated component C to the viewing user so that the user can immediately understand which physical component C is represented by the respective component data object CDO. In the example shown in FIG. 2 the component data object CDO represents a complex production machine of a semiconductor production facility. The complex machine comprises several sub-components or sub-systems including interface components such as connectors or adapters for resources R including physical and/or electrical resources. In a possible embodiment the user can move in a virtual environment within the three-dimensional facility data model, FDM. In a specific implementation the user can be even visualized himself by a displayed user symbol U-SYMB and/or can be represented himself in a possible implementation by an animated figure walking through the three-dimensional facility data model FDM of the facility 2. In a possible embodiment the user can input commands for moving the walking user symbol within the three-dimensional facility data model FDM. In this specific implementation the user may for instance walk to the component data object CDO representing the physical production machine C within a specific room of the facility building. In the example shown in FIG. 2 the animated user symbol U-SYMB walks under control of the user through a door of the facility data model FDM into a specific room where a component data object CDO representing a component C positioned in that room is displayed to the user. In a possible implementation the user can input a command to switch between a view where he can see the associated user symbol U-SYMB from an outside perspective as shown in FIG. 2 or from the perspective of the virtual user symbol U-SYMB. Further, the user has the possibility to switch between a normal display mode and a data edit mode, DEM. The data edit mode DEM is a graphical edit mode where the different component data objects CDOs become transparent so that the embedded component data object cubes CDOCs become visible.

Figure 3:
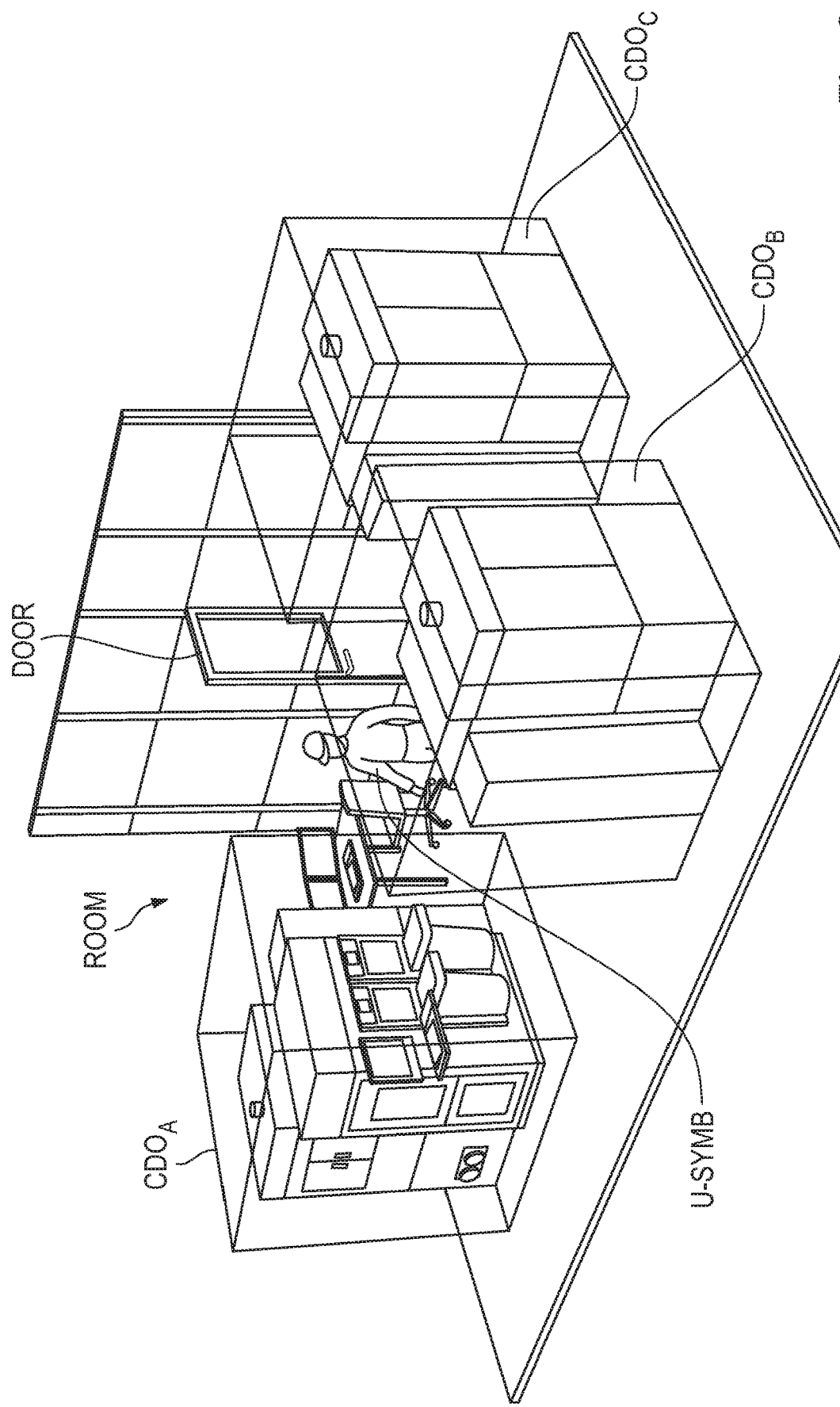
FIG. 3 shows a view on an exemplary facility comprising several component data objects to illustrate the operation of a facility management system and a method for planning and/or operating a facility according to the present invention.

FIG. 3 shows a room of a production facility 2 wherein several components C are positioned in the same room of the building of the facility 2. Each of the three components is represented by a corresponding associated component data object CDO. The position of the different component data objects, CDOs, corresponds to the location of the physical components within the facility 2. In the example shown in figure there are three different component data object, $CDO_A$, $CDO_B$, $CDO_C$ each representing a production machine or production component of the facility 2. In the illustrated embodiment the different components C represented by the component data objects, $CDO_A$, $CDO_B$ and $CDO_C$ are of the same type and are represented by the same type of component data objects CDOs. The user can control the position and movement of the user symbol U-SYMB and can walk virtually in a possible implementation through a three-dimensional virtual facility data model, 3D, VR-FDM, of the facility 2. For instance, the user may control the movement of the user symbol U-SYMB such that the user symbol U-SYMB walks to the second component data object $CDO_B$ to have a closer look at this component data object CDO. After having reached the component data object $CDO_B$, the user may input a control instruction or control command to switch to the transparent data edit mode, DEM, to view the component data object cubes CDOCs embedded within the component data object $CDO_B$. In a possible implementation the user symbol U-SYMB may be even controlled by the user such that it interacts with components C for instance with building components BC of the facility 2 such as a component data object CDO illustrating a door of the building. The user symbol U-SYMB for instance can be controlled by the user such that its hand presses a displayed handle of the door to enter the room and to move to a position where the user can take a closer look to a specific component data object CDO of interest. A closed door which cannot be opened by the user symbol or avatar of the user can indicate that the user has not the rights to view and/or process the CDOs in this virtual room of the building.

Figure 4:
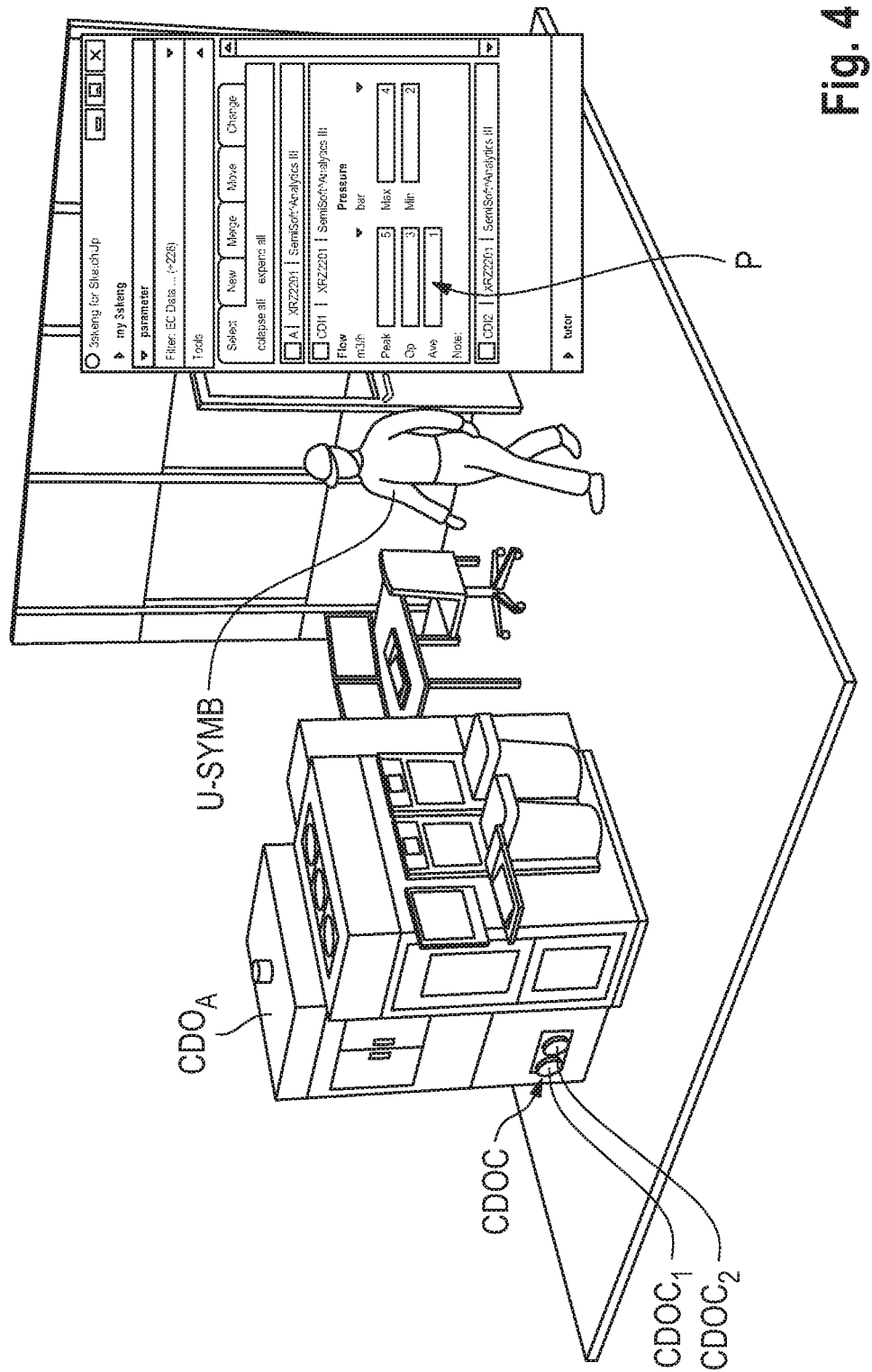
FIG. 4 shows a view on a component data object, CDO, comprising a component data object cube, CDOC, in a data edit mode to illustrate the operation of a facility management system and a method for planning and/or operating a facility according to the present invention.

FIG. 4 illustrates a component data object CDO of a physical component of the facility 2 after having switched to the data edit mode DEM. After having switched to the data edit mode DEM the component data object CDO becomes transparent so that the component data object cubes CDOCs embedded within the component data object CDO become visible to the user. In the illustrated embodiment a first component data object $CDO_A$ becomes transparent so that two different embedded component data object cubes $CDOC_1$ and $CDOC_2$ embedded in the component data object $CDO_A$ become visible. The component data object cubes CDOCs comprise in the illustrated example embedded facility component data object cubes FCDOCs including consumer component data object cubes CCDOCs and source component data object cubes SCDOCs. The consumer data object cubes CDOCs can be of the same or different cube type. For instance, the first component data object cube $CDOC_1$ can be associated with a first resource R1 and the second component data object cube $CDOC_2$ can be associated with a second resource R2. In a specific example the first component data object cube $CDOC_1$ can be for instance be associated with electrical power consumed by the component C represented by component data object $CDO_A$ and the second component data object cube $CDOC_2$ can be associated with a physical resource such as a fluid or gas consumed by the component represented by the component data object $CDO_A$. In this case, both component data object cubes $CDOC_1$, $CDOC_2$ are consumer component data object cubes CCDOCs. It is also possible that the component data object cubes $CDOC_1$, $CDOC_2$ comprise source component data object cubes SCDOCs in case that the component C represented by the component data object $CDO_A$ is capable of generating and/or providing resources R to other components within the facility 2. For instance, if the component C represented by the component data object cube $CDO_A$ comprises a storage device such as a battery for storing electrical energy or power or a container for storing a volume of gas or fluid it can provide other components C of the facility 2 with resources and may include source component data object cubes SCDOCs.

The component data object $CDO_A$ representing a manufacturing component in the facility 2 can also comprise embedded other component data object cubes of other types (not illustrated in FIG. 4). These other component data object cubes CDOCs can comprise scheduling component data object cubes, cost component data object cubes, and/or organization component data object cubes. A cost component data object cube embedded in the component data object $CDO_A$ becoming visible in the transparent data edit mode DEM can for instance indicate the costs for acquiring the respective production component C. Further, the embedded cost component data object cube can also indicate the costs for operating or repairing or maintaining the component during operation of the facility 2. An embedded scheduling component data object cube embedded in the component data object $CDO_A$ as illustrated in FIG. 4 can for instance indicate scheduling parameters SCHP of the respective production component indicating for instance a date or week when the production component can be delivered for assembly in the facility 2. Further, an embedded organization component data object cube ORG-CDOC becoming visible after switching to the transparent data edit mode DEM can indicate organization parameters ORGP concerning the respective production component C represented by the component data object $CDO_A$. The organization parameter ORGP can for instance indicate a person who is responsible for the planning, operation or maintenance of the facility component C represented by the component data object $CDO_A$. In a possible embodiment different kinds of embedded component data object cubes CDOCs including embedded facility component data object cubes, FCDOCs, embedded cost component data object cubes, COST-CDOCs, embedded scheduling component data object cubes, SCH-CDOCs, and/or embedded organization component data object cubes, ORG-CDOCs, can be filtered by the user in response to a filtering command. For instance, a user can filter the different kinds of embedded component data object cubes CDOCs such that only the embedded facility component data object cubes FCDOCs become visible in case that the user is currently not interested in cost aspects, scheduling aspects or organization aspects during the a planning phase of the facility 2. Another user such as a cost controller of a project can input a filter command so that only embedded cost component data object cubes COST-CDOCs becomes visible to him.

Each component data object cube CDOC can comprise several parameters P of the respective associated component C editable in the data edit mode DEM as illustrated in FIG. 4. In response to a specific command parameters P of a component data object cube CDOC can be displayed to the user. In a possible implementation the user can select a specific component data object cube CDOC such as component data object cube $CDOC_1$ to edit the parameters P of the component data object cube. In a possible implementation values of parameters P of a component data object cube CDOC can be edited and changed by user using a parameter mask as illustrated in FIG. 4. When generating a component data object cube CDOC for instance in response to a cube generation command basic parameters can be loaded automatically from a project data cube PDC having a relational link with the component data object cube CDOC. When generating a data object of a data object cube CDOC parameters P can be set in a specific implementation to predetermined default values which can be changed by the user in the transparent data edit mode DEM using the parameter input mask as shown in FIG. 4. In a possible implementation the input values can undergo a check whether the input values are plausible and/or not plausible, for instance whether they are in an admissible parameter range. In this embodiment an input plausibility check is performed to reduce the probability of input errors by the user.

Figure 5:
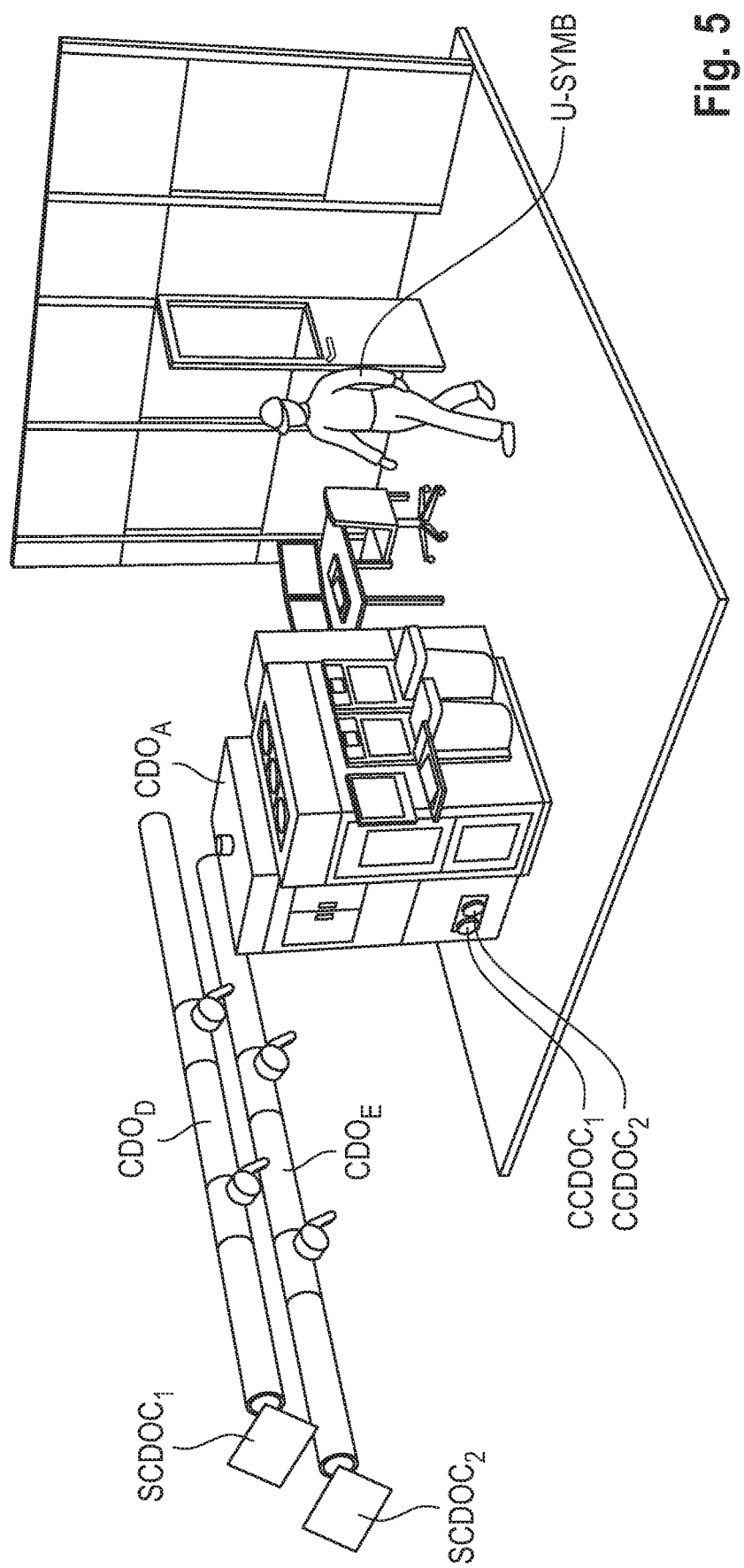
FIG. 5 shows a further view to illustrate the use of the source component data object cubes and/or consumer component data object cubes by a method and system according to the present invention.

FIG. 5 shows a further exemplary implementation of the facility management system 1 according to the present invention. In the illustrated embodiment the component data object $CDO_A$ representing a manufacturing component C within the facility 2 comprises a consumer component data object cube $CDOC_1$ indicating a resource R1 consumed by the respective production component C. For instance the consumer component data object cube $CCDOC_1$ can indicate the amount or rate of water ($H_2O$) consumed by the respective component C represented by the component data object $CDO_A$. In the illustrated embodiment the facility 2 further comprises a resource transport pipe component represented by a component data object $CDO_D$. The resource transport pipe component is adapted to transport a resource, i.e. water, to different components C within the facility 2. In the illustrated embodiment of FIG. 5 the component data object CDOA representing a production component C of the facility 2 comprises a further consumer component data object cube $CCDOC_2$ representing another resource R2 consumed by the respective component C for instance a gas such as $H_2$ consumed by the fabrication component C during a manufacturing process step. The other resource R2, i.e. $H_2$ can be transported in the illustrated example through another resource transport pipe component or pipe represented by the resource transport pipe component data object $CDO_E$ as shown in FIG. 5. Both resource transport pipe component data objects $CDO_D$, $CDO_E$ comprise in the illustrated example a source component data object cube SCDOC. The component data object $CDO_D$ transporting a fluid such as $H_2O$ comprises the source component data object cube $SCDOC_1$. The component data object $CDO_E$ representing a transport pipe for transporting hydrogen H2 comprises the source component data object cube $SCDOC_2$. The first source component data object cube $SCDOC_1$ is linked to the component data object $CDO_D$ and the second source component data object cube $SCDOC_2$ is linked to the component data object $CDO_E$. In the illustrated embodiment the source component data object cubes SCDOCs comprise source parameters SPs of resources R1, R2 which can be supplied via pipes to other components C of the facility 2. These source parameters SPs comprise in the illustrated embodiment physical resources PR including fluids or gases. The first source component data object cube $SCDOC_1$ includes source parameters $SP_1$ concerning the supply of the first resource R1, i.e. water. The other source component data object cube $SCDOC_2$ comprises source parameters $SP_2$ concerning the supply of the gas $H_2$ to other components C within in the facility 2. In a possible embodiment the size of the component data object cubes, i.e. the consumer data object cubes $CCDOC_1$, $CCDOC_2$ as well as of the source data object cubes $SCDOC_1$, $SCDOC_2$ can correspond to an amount or a rate of a resource R consumed or provided by the respective component C. In the example of FIG. 5 the size of the first consumer component data object cube $CCDOC_1$ and the size of the second consumer component data object cube $CCDOC_2$ is equal indicating that the corresponding production component represented by the component data object $CDO_A$ consumes the same amount of gas $H_2$ and water $H_2O$. The pipes represented by the component data object $CDO_D$ and $CDO_E$ form part of a supply system of the facility 2 adapted to distribute the respective resources R1, R2 to the resource consuming components C of the facility 2. It is also possible that consumer components as production components produce exhaust gases or waste water which are disposed with using a separate pipe system of the facility 2.

Figure 6:
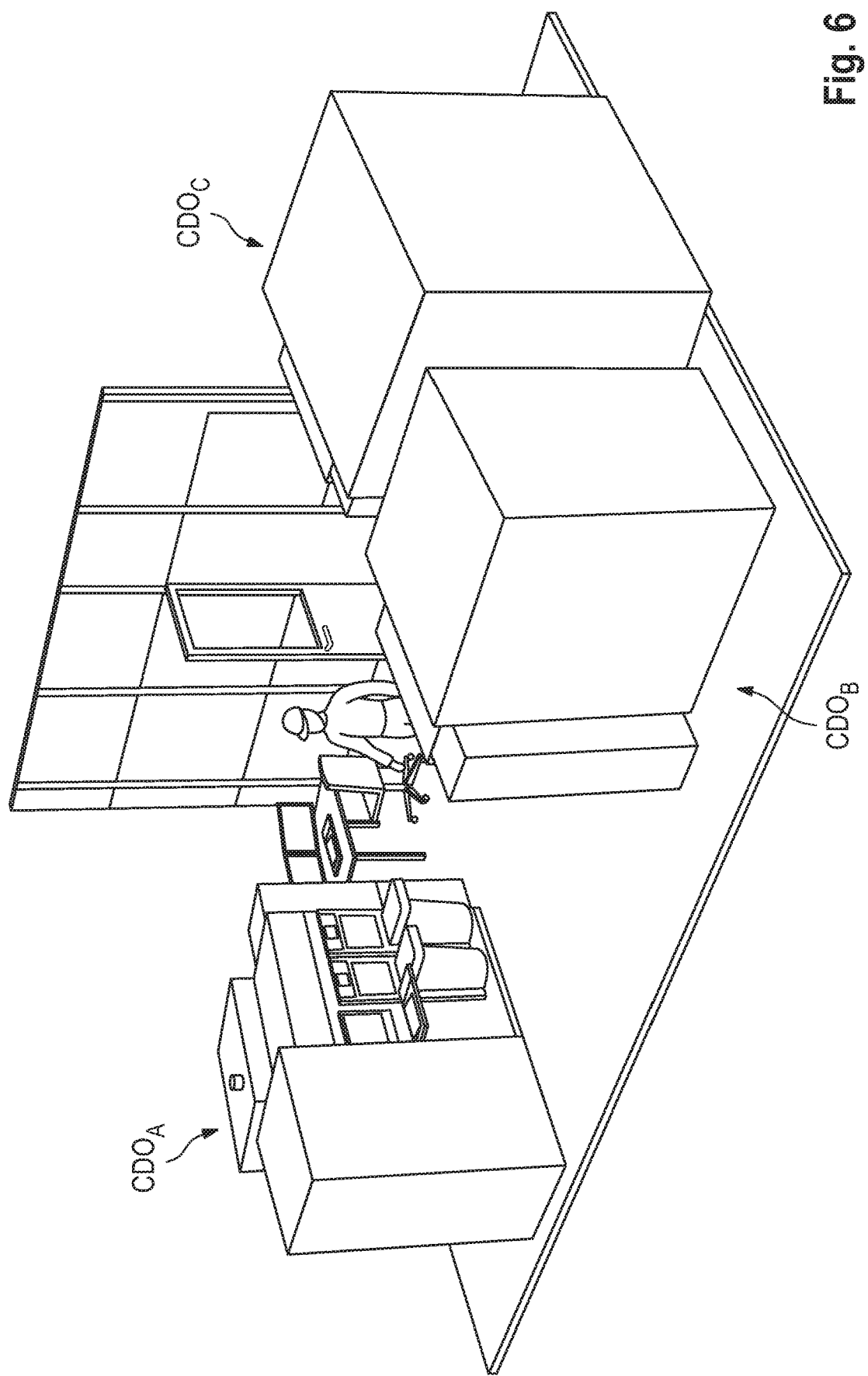
FIG. 6 shows a further schematic view to illustrate a possible embodiment of the method and system according to the present invention.
Figure 7:
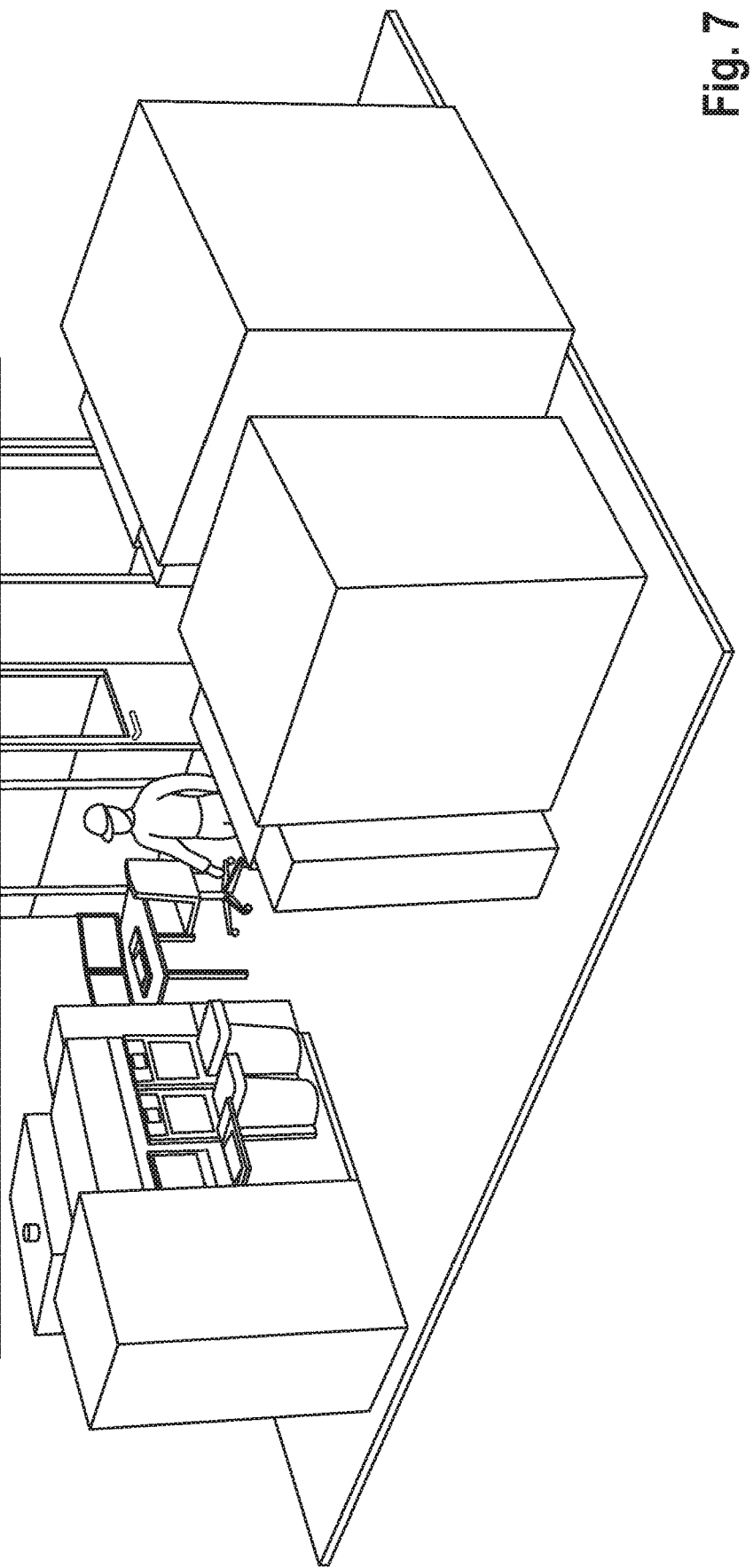
FIG. 7 shows a further view to illustrate the embodiment shown in FIG. 6.

The size of a component data object cube CDOC can correspond in the possible implementation to the amount or rate of a resource R consumed or provided by the respective component as illustrated in FIG. 6. In the illustrated example the amount or rate of the resource R such as water consumed by the production component C represented by the component data object $CDO_C$ is higher than the amount or rate of the consumed resource water consumed by the component represented by the component data object $CDO_B$. In the illustrated embodiment shown in FIG. 6 the rate of the resource water consumed by the component represented by the component data object $CDO_A$ is the lowest and is smaller than the amount or rate of water consumed by the other two components shown in FIG. 6. The exact amount or rate of the different resources R provided or consumed by the different components C represented by the different component data objects CDOs can be edited by a user in response to a corresponding input command as illustrated in FIG. 7.

Figure 8:
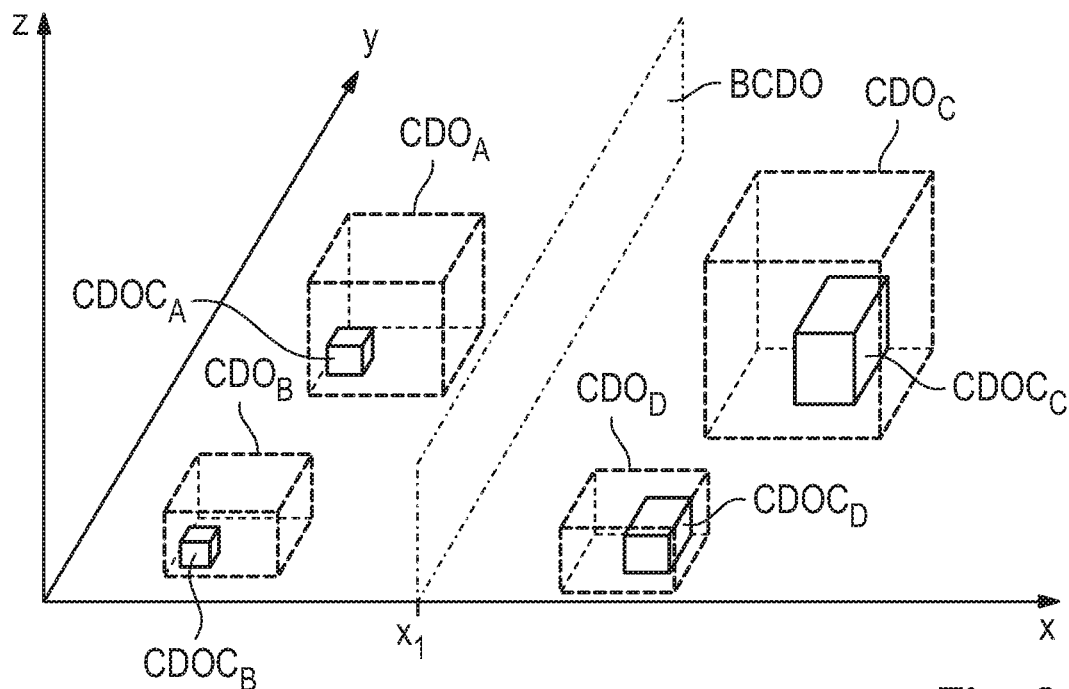
FIG. 8 is a schematic diagram to illustrate a possible exemplary embodiment of the method and system according to the present invention.

FIG. 8 illustrates the possibility of an automatic calculation of aggregated resource consumption values and/or aggregated resource provision values within the facility management system 1 according to the present invention. The consumed and/or provided resources R of the same resource type RT such as water or gas or electrical power is indicated by the consumption parameters CPs of the consumer component data object cubes CCDOCs and/or by the source parameters SPs of the source component data object cubes SCDOCs of the corresponding cube type CT. Selected component data object CDOs can be aggregated automatically in response to an aggregation command to calculate an aggregated resource consumption value and/or the aggregated resource provision value. In the illustrated example of FIG. 8 different component data objects $CDO_A$, $CDO_B$, $CDO_C$, $CDO_B$ are illustrated presenting four different components C of a production facility 2. In the illustrated example also a building component data object BCDO is shown representing building component BC of a building of the production facility 2. In the illustrated example the building component data object BCDO represents a wall in the building of the production facility 2. Components A, B are located in a room left to the building wall and the other two components C, D are located the other side, i.e. right to the building wall as illustrated by the building component data object BCDO. In the illustrated example a wall extends through the building along coordinate $x_1$. In the example all component data objects CDOs comprise a single component data object cube CDOC for a specific resource R. In the example all component data object cubes CDOCs are consumer component data object cubes CCDOC which represent the consumption of a specific resource R such as water by four different components C of the production facility 2 located in the two different rooms separated by the building component BC, i.e. the wall represented by the building component data object BCDO. Further, the size of the component data object cube CDOC indicate the amount or rate of the resource R, i.e. water consumed by the respective component C. As can be seen in FIG. 8 the amount of water consumed by the component C represented by the component data object $CDO_C$ is the highest because the size of the corresponding associated component data object cube CDOC is the biggest as illustrated in FIG. 8. In response to an aggregation command input by the user or by a remote control unit of the facility management system 1 consumed and/or provided resources R of the same resource type RT such as water as indicated by the consumption parameters CPs of the consumer component data object cubes CCDOCs and by the resource parameters SPs as the source component data object cubes SCDOCs of the corresponding cube type CT of the selected component data objects CDOs are aggregated automatically in response to the aggregation command to calculate an aggregated resource consumption value and/or an aggregated resource provision value for all selected component data objects. For instance, a user might select all component data objects CDOs and all components indicated on the right side of the building component, i.e. wall, that is all components C comprising a location having an X coordinate bigger than X1. In this case the amount of water consumed by the component C and the amount of water consumed by the component D are aggregated or added to calculate automatically an aggregated resource consumption value indicating the amount of water consumed by all components C, D on the right side of the building wall. On the other hand, if the user does select all components C on the left side of the building wall, i.e. the component A and the component B represented by the component data objects $CDO_A$, $CDO_B$ the amount of water consumed by the components A and B on the left side of the building wall is calculated automatically leading to a much lower total water consumption of the components C on the left side of the wall. Naturally, the aggregated resource consumption value has an impact on the planning of the water supply system provided within the facility 2. The selection of the group of components C can be performed in different ways. In a possible embodiment the user may select the component data objects CDOs of a component group by selecting individually each component data object CDO belonging to a component of the group for instance by clicking on the component data object CDO or by pointing a finger to the component data object CDO in a virtual reality facility data model. Another possibility to select component data objects CDOs belonging to a specific group of components C to be investigated is to select a building component BC represented by building component data object BCDO such as wall and then to calculate the aggregated resource consumption value located on one side or both sides of the selected building component BC. For instance, a user may also select a specific room within the facility building to calculate automatically a total resource consumption or a total resource provision value of all components C located within the selected room of the facility building.

Figure 9:
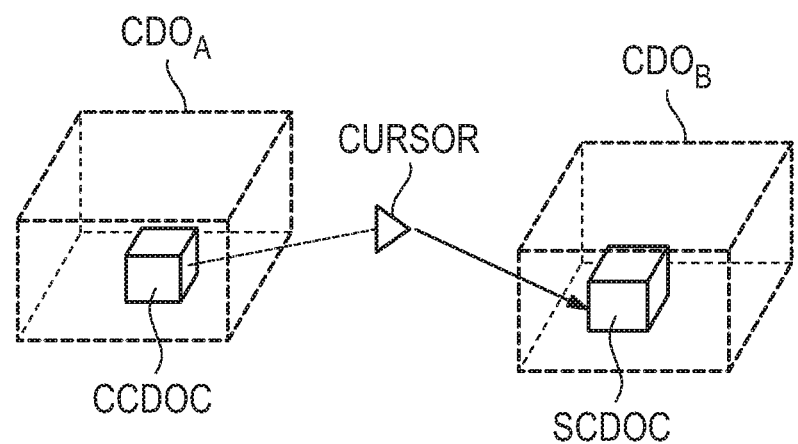
FIG. 9 shows a further view for illustrating a possible embodiment of the method and system according to the present invention.

FIG. 9 shows schematically a possible embodiment of the facility management system 1 according to the present invention. In this illustrated embodiment a first component A represented by component data object $CDO_A$ comprises a consumer component data object cube CCDOC indicating a resource R consumed by the respective component A. Further, another component B represented by the component data object $CDO_B$ comprises a source component data object cube SCDOC representing a resource R which can be provided by the respective component B of the facility 2. The consumer component data object cube CCDOC linked to the component data object $CDO_A$ representing a component A within the facility 2 can be connected to a target source component data object cube SCDOC of the same cube type CT linked for instance to the component data object $CDO_B$ of component B within the facility 2 by first selecting the consumer component data object cube CCDOC in response to a selection command to generate automatically a stretchable rubber band symbol between the selected consumer component data object cube CCDOC and a displayed cursor as illustrated in FIG. 9. The stretchable rubber band symbol is illustrated as a dashed line in FIG. 9. The cursor can then be moved in response to a cursor position control command to the position of the target source component data object cube SCDOC. As soon as the cursor has reached the position of the source component data object cube SCDOC a link can automatically be generated between the consumer component data object cube CCDOC and the target source component data object cube SCDOC in response to a link or connection command, for instance a click of the computer mouse forming part of the command input unit 3B. The virtual rubber band symbol between the cursor and the consumer component data object cube CCDOC can be animated. In a possible implementation for instance when the cursor approaches the displayed target source component data object cube SCDOC the stretchable rubber band symbol can be attracted similar to a magnetic force by the displayed target source component data object cube SCDOC so that a connection is facilitated for the user. In a possible embodiment the stretchable rubber band symbol between the selected consumer component data object cube CCDOC can be moved to the position of different resource interfaces, RIs, of a resource supply network, wherein the CCDOC gets the data of the target source component data object cube SCDOC. The resource interfaces are positioned along a resource transport pipe component. A resource transport pipe component data object, RTPCDO, can represent the resource transport pipe component adapted to transport a resource R of a resource type RT corresponding to the cube type CT of the consumer component data object cube CCDOC and to the cube type CT of the target source component data object cube SCDOC. A network of resource transport pipe components and interface components can be generated in a possible embodiment by a corresponding application program of a planning tool. Each resource supply network comprises at least one SCDOL connected to a main resource transport pipe component as shown in FIG. 10 from which sub resource transport pipe components are branched off.

Figure 11A:
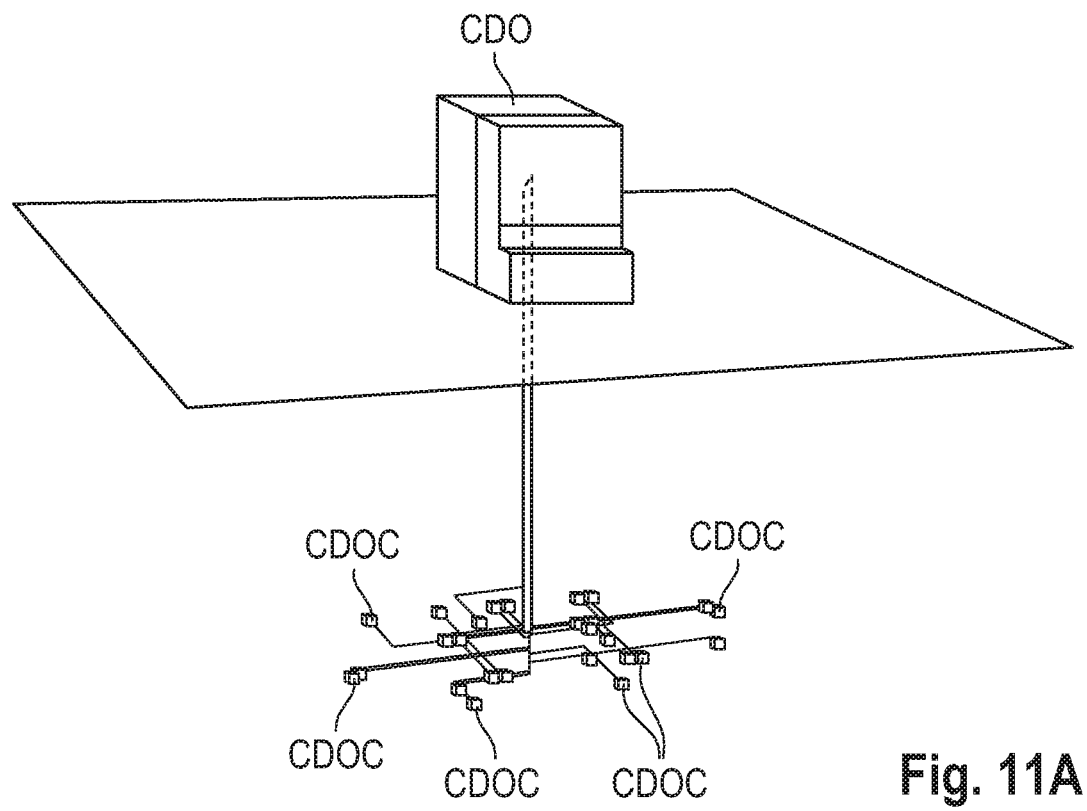
FIGS. 11A, 11B illustrate a further exemplary embodiment of the method and system according to the present invention.
Figure 11B:
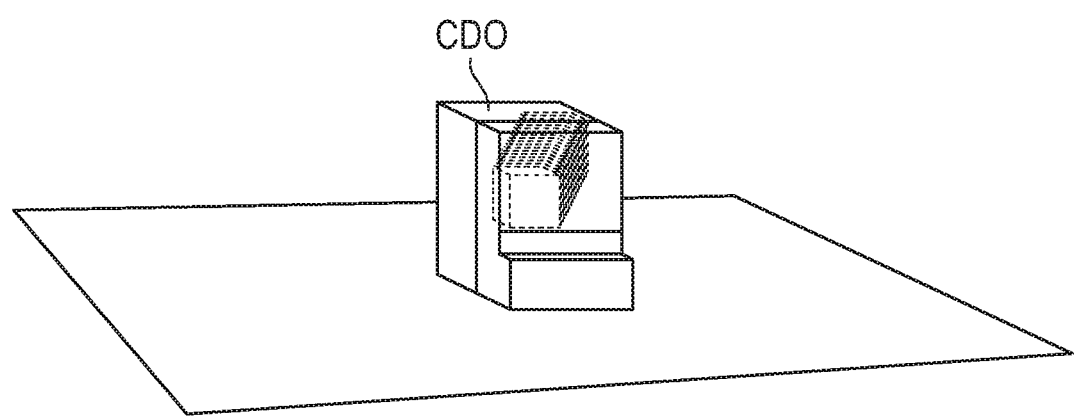

FIGS. 11A, 11B illustrate a possible implementation of the merging of component data object cubes in response to a merge command. In the schematic view of FIG. 11A different data object cubes of the same or different types belong to components C represented by a component data object CDO as shown in FIG. 11A. In response to a merge command all component data object cubes CDOCs of the same cube type CT are merged to a single component data object cube CDOC of the corresponding resource type RT and are embedded into the component data object CDO of the respective component C as illustrated in FIG. 11B.

The facility management system FMS 1 can be used for planning and controlling any kind of facility 2 comprising a plurality of same or different components C. The facility management system 1 according to an aspect of the present invention can be used very efficiently for planning a production facility in particular a semiconductor production facility.

In the illustrated embodiment of the component data object cubes CDOCs are illustrated as a cube, i.e. a graphical symbol representing the component data object cube. A component data object cube CDOC comprises parameters P of the respective component C that can be edited in the transparent data edit mode DEM of the facility management system 1. The component data object cube CDOC can also be represented in other implementations by other symbols, of different form, shape or color. The method for planning and/or operating a facility 2 such as a production plant comprising a plurality of components C can be implemented as an engineering tool or as a control tool for the facility 2. In a further embodiment the processing of the data, i.e. the updating of the facility data model FDM stored in the memory 5 of the facility management system 1 and/or the generation of control signals for the facility 2 on the basis of the facility data model FDM can be also performed in real time. In a possible embodiment the operation of the components C within the facility 2 can also be simulated on the basis of the generated and updated three-dimensional facility data model FDM of the facility 2. A facility 2 can in a possible implementation CDOCs for different domains and can be planned from different points of view, i.e. focussing on the consumption and provision of different kind of resources R, costs of the components C and/or resources R, organizational responsibilities for different components C and resources R, and or focussing on project data in particular scheduling data during the planning of the facility 2. The planning and/or operation tool allows to efficiently plan, simulate, operate and/or maintain a complex facility 2 comprising a plurality of interrelated connected components C of different types. In a possible embodiment processing unit 3A comprises one or several microprocessors adapted to perform calculations on the basis of the two- or three-dimensional facility data model FDM stored in the memory 5 of the facility management system 1. On the basis of the facility data model FDM a detailed analyzation of the performance of the planned or operated facility 2 can be performed taking into account also the positional data of the different components C represented by the component data objects CDOs. For instance, the amount or rate of a specific resource R consumed in a determined space or room within the facility 2 can be calculated in response to an aggregation command and an resource supply system comprising for instance pipes, pumps, valves can be planned accordingly to meet the resource demand within the selected area of the facility 2. The method for planning and operating a facility 2 can be used for a wide range of different facilities including production facility but also building facilities or infrastructure facilities or other complex systems providing a plurality of interacting components C which provide, transport or consume resources R.

The embodiment of the facility management system 1 as illustrated in FIG. 1 is only exemplary. For instance the apparatus 3 and the database 4 can be connected directly as illustrated in FIG. 1 but also via a data network forming a distributed system. The facility management system 1 can form part the control system of the facility 2. The processing unit 3A can comprise a control unit or controller adapted to generate control signals CRTL supplied to components C of the facility 2. The control signals CRTL can be electrical control signals carried by an electrical resource, a hydraulic control signal carried by a fluid resource and/or a pneumatic control signal carried by a gas resource of the facility 2. The controller can be located in the processing unit 3A of the apparatus 3 but also in the facility 2. In a possible embodiment at least one sensor component SC of the facility 2 is adapted to sense the provision and/or consumption of different resources R by other components C within the facility 2. The controller can be adapted to process the facility data model FDM stored in the memory 5 of the facility management system 1 in response to commands input a user by means of a command input unit 3B such as a computer mouse or in response to gestures made by a user and detected by the gesture detection unit 3C connected to the controller of the facility 2. A control and/or regulation of parameters P within the facility 2 can be performed in a possible implementation in real time. In a possible embodiment, a user can walk through a real physical facility 2 comprising a plurality of interrelated components C such as production machines wearing an augmented reality, AR, goggle enriching the facility data model FDM of the facility 2 with additional data, in particular component data objects CDOs with the embedded component data object cubes CDOCs. For instance a maintenance operator performing repair or maintenance operations of components C of the facility 2 can be supported by the facility management system 1 according to the present invention. A user may for instance test a specific component C within the facility 2 for instance by pressing control button at the physical component C under the supervision of the facility management system 1. The facility management system 1 can guide a user to the component C of interest using the position data of the components C represented by the component data object CDO and support the user to select the fitting component C for performing the test. Accordingly, there is a wide range of possible applications for the method and system according to the present invention and in the above-illustrated embodiments are only exemplary.

The invention provides according to a further aspect a facility management system for planning and/or controlling a facility comprising a plurality of physical components. The facility management system has at least one apparatus comprising a data storage, a processing unit, a user input interface and a display screen. The data storage contains in a possible embodiment representations of the geometry of the physical components of a facility and further contains data linked to the physical components of the facility. The processing unit of the apparatus is adapted to load, edit and process the data stored in the data storage. The user input interface of the apparatus enables the user to specify a location inside a virtual representation of the facility. The display screen is adapted to show the geometry of the stored facility components and to visualize the data linked to the facility components as virtual geometrical objects forming data visualization objects embedded inside or placed at the geometrical representation of the respective facility component. The data visualization objects are selected in response to a user input or automatically according to a program in order to perform actions with a subset of the respective data visualization objects. The data visualization objects comprise component data object cubes, CDOCs. The data visualization objects or component data object cubes can be embedded inside the displayed geometrical representation of the respective physical facility component. Further, the data visualization objects or component data object cubes can also be placed at or in the vicinity of the geometrical representation of the respective facility component.

In a possible embodiment of the facility management system according to the present invention, the data of a specified subset of data visualization objects shown on a headup display worn by user is displayed on a mobile computer device carried by the user having a user interface to edit the specified data set. The mobile computer device can be any mobile device such as a laptop or a handheld mobile phone.

In a possible embodiment, the component data object cube, CDOC or data visualization object of a component data object CDO is displayed on a goggle or headup display worn by a user. At least one component data object cube CDOC can be selected by a gesture of the user or by any other user input. The gesture is for instance an air tap gesture made by the user. The gesture can be detected by a gesture detection unit 3C. In response to the selection gesture or user input, a reference to a data set stored in a distributed or centralized data storage is automatically transferred to the computer device. The reference can comprise an identifier ID referencing to at least one data set associated to the data visualization object or component data object cube CDOC stored in the data storage. In this way, the computer device has access to the associated data sets belonging to the selected component data object cube CDOC. The data set can be stored in a centralized data storage or database. Alternatively, the dataset can also be stored in a distributed data storage, for instance in distributed construction files or CAD files of the component data objects CDOs. The computer device such as a laptop comprises a user interface to edit by the user the data set loaded from the distributed or centralized data storage and displayed to the user on a screen of the user interface. Accordingly, it is possible to select a component data object cube CDOC with a predetermined selection gesture such as an air tap gesture and to edit the data of the loaded data set using the convenient user interface of the computer device, for instance using a keyboard of the computer device. Consequently, the user can select easily a data set by means of component data object cubes CDOCs and can then comfortably edit data of the selected data set, for instance parameters of a component within the facility. The component data objects CDOs and associated component data object cubes CDOCs forming data visualization objects can be displayed on a virtual reality, VR, goggle or on an augmented reality, AR, goggle worn by a user. At least one component data object cube CDOC of a component data object CDO representing a physical component of the facility can be selected by a gesture of the user to transfer automatically a reference such as an ID or an address of an associated data set stored in a distributed or centralized data storage to a computer device having a user interface to edit by the user the data set loaded from the data storage and displayed to the user on the screen of the user interface. In a possible embodiment, the reference to the data sets can be transferred automatically via a wireless link between the processing unit of the facility management system and the computer device. In an alternative embodiment, the reference can also be transferred via a wired link between the facility management system and the computer device.

In a possible embodiment, the selection of a component data object cube CDOC can be performed by a user manually, in particular by performing a predetermined gesture such as an air tap gesture. In this embodiment, the component data object cube CDOC is used to get access to an associated data set stored in a data storage in response to a selection event, i.e. the user gesture. In alternative embodiments, the selection event can comprise other kinds of events, for instance a filter event. For instance, a user can trigger a selection of all component data object cubes CDOCs belonging to the same component data object CDO representing a specific physical component of the facility. For instance, a user can select all component data object cubes CDOCs belonging to a specific machine within a factory. Another possible selection is to filter all component data object cubes CDOCs belonging to a component or component data object fulfilling a specific condition or requirement. For instance, component data object cubes CDOCs of all component data objects can be automatically selected through filtering according to a predetermined rule or condition. For instance, all component data object cubes CDOCs can be selected belonging to physical components of the facility which consume a specific resource or whose resource consumption is higher than an adjustable or predefined threshold. The identifiers IDS of data sets belonging to the selected or filtered component data object cubes CDOCs are transferred as a reference through a wired or wireless link from the facility management system FMS to the computer device of the user. The link can comprise a wired link or a wireless link. Any kind of wireless link is possible including Bluetooth, WLAN, or USB. The computer device receiving the reference gets access to a distributed or centralized data storage storing associated data sets belonging to the selected component data object cubes CDOCs or selected data visualization objects. The content of the data set can vary. In a possible embodiment, the data set comprises different parameters of the respective physical facility component C represented by the component data object CDO to which the selected component data object cubes CDOCs are linked.

The invention claimed is:

1. A facility management system comprising:
a memory storing instructions and at least one processing unit to execute the instructions for planning and/or controlling a facility comprising a plurality of components, said facility management system comprising at least one apparatus adapted to load component data object cubes from a data cube library stored in a database of said facility management system and to link the component data object cubes to the component data objects representing components of said facility, wherein the loaded component data object cubes comprise virtual entities visualizing data or parameters of the respective component, and provide an interface to select, move or edit component data sets, stored in a centralized location or distributed locations in a data storage of said facility management system, and wherein the processing unit is adapted to load at least one editable component data object cube from said data cube library stored in said database connected to said processing unit and adapted to link the loaded component data object cube to a component data object representing at least one component of said facility said apparatus further comprising a command input unit adapted to input commands by user and/or a gesture detection unit adapted to derive commands from gestures made by a user and detected by said gesture detection unit.

2. The facility management system according to claim 1, wherein an operation of components of said facility is controlled or simulated by the facility management system by processing a generated facility data model of said facility comprising component data objects representing the components of said facility and having associated component data object cubes linked to the component data objects of the components of said facility.

3. The facility management system according to claim 2 wherein the components of said facility are adapted to perform operations controlled and/or simulated by said facility management system, wherein the components comprise:
  resource providing components,
  resource consuming components,
  sensor components adapted to sense provision and/or consumption of resources by other components of said facility and to generate corresponding sensor parameters; and
  actuator components adapted to control the provision and/or consumption of resources by other components of said facility.

4. The facility management system according to claim 1, wherein the facility comprises a production facility comprising:
  production components including machines, or
  a building facility comprising building components, and/or
  a vehicle comprising vehicle components.

5. The facility management system according to claim 1, wherein the component data objects representing components of said facility comprise:
  embedded facility component data object cubes including consumer component data object cubes and source component data object cubes; and/or
  embedded cost component data object cubes comprising cost parameters of the respective component; and/or
  embedded scheduling component data object cubes comprising scheduling parameters of the respective component; and/or
  embedded organization component data object cubes comprising organization parameters of the respective component.

6. The facility management system according to claim 1, wherein the components of said facility comprise at least one interface component adapted to receive controls signals provided by a controller of said facility generated by said controller on the basis of the facility data model of said facility stored in a memory and comprising component data objects representing components of said facility and having associated component data object cubes linked to the component data objects representing the components of said facility and on the basis of sensor parameters provided by at least one sensor component of said facility, wherein the control signals are generated by said controller in real time by processing the facility data model in response to sensor parameters received from at least one sensor component of said facility and supplied to actor components of said facility,
  wherein the control signals are electrical control signals carried by an electrical resource, or hydraulic control signals carried by a fluid resource and/or pneumatic control signals carried by a gas resource of said facility, wherein the at least one sensor component of said facility is adapted to sense the provision and/or consumption of resources by other components of said facility.

7. The facility management system according to claim 6, wherein the controller is adapted to process the facility data model of the facility in response to commands input by a user by means of a command input unit, and/or in response to gestures made by a user and detected by a gesture detection unit connected to said controller of said facility.

8. The facility management system according to claim 1, wherein said component data object cubes are adapted to visualize quantities of parameters of the components of said facility, wherein the quantity is visualized by color, texture, shape or size of said component data object cube.

9. The facility management system according to claim 1, wherein the facility data model of the facility is displayed to the user by means of a virtual reality goggle or by means of an augmented reality goggle worn by the user.

10. The facility management system according to claim 9, wherein a component data object cube of a component data object displayed on a goggle worn by a user is selected by a gesture of the user or other user input to automatically transfer a reference to a data set stored in a distributed or centralized data storage to a computer device having a user interface allowing to edit the loaded data set displayed to the user on a screen of said user interface.

11. A method for planning and/or operating a facility comprising the steps of:
  loading (S1) component data object cubes from a data cube library stored in a facility management system;
  linking (S2) the component data object cubes to the component data objects representing components of said facility;
  wherein the loaded component data object cubes comprise virtual entities included in the loaded component data object cubes;
  visualizing data or parameter of the loaded component by the virtual entity; and
  selecting, moving or editing (S3) component data sets, via an interface stored in a centralized location or distributed location in a data storage of said facility management system.

12. The method according to claim 11, wherein each component data object representing at least one component of the facility is transparent in a data edit mode and comprises embedded component data object cubes linked to said component data object, wherein the component data object cube linked to a component data object comprises a consumer component data object cube comprising consumption parameters of the respective component and/or a source component data object cube comprising source parameters of the respective component,
  wherein the consumption parameters of a consumer component data object cube linked to a component data object representing a component of said facility indicate resources consumed by the respective component, and
  wherein the source parameters of a source component data object cube linked to a component data object representing a component of said facility indicate resources provided by the respective component to other components of said facility.

13. The method according to claim 11, wherein the resources consumed by a component of said facility or provided by said component to other components of said facility as indicated by the consumption parameters of the consumer component data object cubes linked to the component data object representing said component and as indicated by the source parameters of source component data object cubes linked to the component data object representing said component comprise energy resources including electrical power and/or physical resources including fluids or gases and/or information resources.

14. The method according to claim 11, wherein a component of said facility comprises at least one subcomponent and/or at least one interface component forming a resource interface with another component of said facility connected to said component to receive a resource from the connected other component or to provide a resource to the connected other component of said facility, wherein the component data object representing a component of said facility comprises component data object cubes of different cube types for each resource type of a resource consumed by the respective component or provided by the respective component to another component of said facility.

15. The method according to claim 11, wherein the size of a component data object cube corresponds to an amount or a rate of a resource consumed by the respective component or provided by the respective component to another component of said facility.

16. The method according to claim 11, wherein data of component data object cubes of the same cube type within the component data object representing at least one component are merged automatically in response to a merge command, and/or
wherein one or several component data objects of components of said facility are selected in response to a selection command, and/or
wherein the consumed and/or provided resources of the same resource type as indicated by the consumption parameters of the consumer component data object cubes and by the source parameters of the source component data object cubes of the corresponding cube type of the selected component data objects are aggregated automatically in response to an aggregation command to calculate an aggregated resource consumption value and/or an aggregated resource provision value for all selected component data objects and/or wherein a component data object cube is loaded from a data cube library stored in a database or generated in response to a cube generation command, wherein basic parameters are loaded automatically from a project data cube having a relational link with said component data object cube, and/or
wherein a component data object cube loaded from said data cube library or generated in response to the cube generation command is linked to a component data object of a component of said facility by placing the component data object cube on the component data object using a cube positioning command and confirming the link between the component data object cube and the component data object with a link command, and/or
wherein a consumer component data object cube of a specific cube type linked to a component data object of a component of said facility is connected to a target source component data object cube of the same cube type linked to a component data object of another component of said facility by selecting said consumer component data object cube in response to a selection command to generate automatically a stretchable rubber band symbol between the selected consumer component data object cube and a cursor which is moved in response to a cursor position control command to the position of the target source component data object cube or to the position of automatically generated copies of said target source component data object cube positioned along a resource transport pipe component data object, connecting the source component data object cube copies with the target source component data object cube and/or
wherein the resource transport pipe component data object represents a resource transport pipe component adapted to transport a resource of a resource type corresponding to the cube type of the consumer component data object cube and the target source component data object cube.

17. The method according to claim 11, wherein the component data objects and associated component data object cubes are displayed on a virtual reality goggle or augmented reality goggle worn by a user, wherein at least one component data object cube of a component data object is selected by a gesture of the user to transfer automatically a reference to a data set stored in a distributed or centralized data storage to a computer device having a user interface to edit by the user the loaded data set displayed to the user on a screen of said user interface.

18. The method according to claim 17, wherein the component data object cube comprises at least one data set including parameters of a component of the facility represented by the component data object to which the component data object cube is linked, and wherein a reference to the data set of the component data object cube displayed on a goggle worn by a user is automatically transferred via a wireless link or via a wired link to the computer device having a user interface with a keyboard to edit the parameters of the data set loaded from the distributed or centralized data storage and displayed to the user on a screen of said user interface.

* * * * *